United States Patent
Zhu

(10) Patent No.: US 12,261,766 B2
(45) Date of Patent: Mar. 25, 2025

(54) REDUNDANT PATH RESOURCE RESERVATION METHOD, NETWORK DEVICE AND STORAGE MEDIUM

(71) Applicant: ZTE CORPORATION, Guangdong (CN)

(72) Inventor: Xiangyang Zhu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 322 days.

(21) Appl. No.: 18/015,062

(22) PCT Filed: Jul. 7, 2021

(86) PCT No.: PCT/CN2021/104917
§ 371 (c)(1),
(2) Date: Jan. 7, 2023

(87) PCT Pub. No.: WO2022/007828
PCT Pub. Date: Jan. 13, 2022

(65) Prior Publication Data
US 2023/0261987 A1 Aug. 17, 2023

(30) Foreign Application Priority Data
Jul. 8, 2020 (CN) .......................... 202010651247.5

(51) Int. Cl.
*H04L 45/00* (2022.01)
*H04L 45/24* (2022.01)
(Continued)

(52) U.S. Cl.
CPC .............. *H04L 45/22* (2013.01); *H04L 45/24* (2013.01); *H04L 45/48* (2013.01); *H04L 47/728* (2013.01)

(58) Field of Classification Search
CPC ....... H04L 45/48; H04L 45/24; H04L 47/728; H04L 45/28; H04L 45/22; H04L 47/821;
(Continued)

(56) References Cited

U.S. PATENT DOCUMENTS

2012/0314597 A1* 12/2012 Singh .................. H04L 41/0686
370/252
2013/0185451 A1 7/2013 Gelter
(Continued)

OTHER PUBLICATIONS

Japan Patent Office, first Office action dated Feb. 13, 2024, for corresponding JP application No. 2023-501186.
(Continued)

*Primary Examiner* — Mohamed A Kamara
(74) *Attorney, Agent, or Firm* — Li & Cai Intellectual Property (USA) Office

(57) ABSTRACT

The present application provides a redundant path resource reservation method, a network device, and a storage medium. The method includes: acquiring, from a received attribute declaration packet of a talker device, a TSN service targeted by the attribute declaration packet and an indication of whether to provide redundant propagation for the attribute declaration packet; duplicating the attribute declaration packet in response to the indication of providing the redundant propagation for the attribute declaration packet, and there are at least two spanning tree instances maintained in a bridge device; propagating the received attribute declaration packet and the duplicated attribute declaration packet, to establish a redundant path for the TSN service between the talker device and a listener device; and performing, in response to receiving a resource reservation request packet for the TSN service from the listener device, redundant path resource reservation for the TSN service.

20 Claims, 9 Drawing Sheets

(51) Int. Cl.
*H04L 45/48* (2022.01)
*H04L 47/726* (2022.01)

(58) Field of Classification Search
CPC ..... H04L 47/72; H04L 47/70; H04L 41/0654; H04L 41/0663
See application file for complete search history.

(56) References Cited

U.S. PATENT DOCUMENTS

| | | | |
|---|---|---|---|
| 2015/0071119 A1* | 3/2015 | Farkas | H04L 45/302 370/255 |
| 2015/0326493 A1* | 11/2015 | Mace | H04L 47/801 370/443 |
| 2016/0149979 A1 | 5/2016 | Farkas et al. | |
| 2017/0214606 A1 | 7/2017 | Park et al. | |
| 2021/0194819 A1* | 6/2021 | Chen | H04L 47/193 |

OTHER PUBLICATIONS

Stephan Kehrer, et al., "A Comparison of Fault-Tolerance Concepts for IEEE 802.1 Time Sensitive Networks (TSN)", Proceedings of the 2014 IEEE Emerging Technology and Factory Automation(ETFA) from Stephan Kehrer et. al dated Sep. 19, 2014.

Oliver Kleineberg, et al., "Fault-tolerant Ethernet networks with Audio and Video Bridging", ETFA 2011 from Oliver Kleineberg dated Sep. 9, 2011.

Oliver Kleineberg, et al., "AVB for low latency/industrial automation networks: Redundancy for fault-tolerance and AVB-Overview of the simultaneous multi-path proposal", IEEE 802 Plenary Meeting from Oliver Kleinerberg et. al.

European Patent Office, extended European Search Report dated Jun. 12, 2024, for corresponding EP application No. 21837953.5.

"Draft Standard for Local and metropolitan area networks—Bridges and Bridged Networks", from Time-Sensitive Networking Task Group of IEEE dated Mar. 13, 2017 XP068113107.

* cited by examiner

| Octet# | | |
|---|---|---|
| 1 | 7 | 8 |
| MAC Address | | Unique ID |

Stream ID

| Octet# | | |
|---|---|---|
| 9 | 15 | 16 |
| Destination Address | | VLAN_ID |

DataFrameParameters

| Octet# | | |
|---|---|---|
| 17 | 19 | 20 |
| MaxFrameSize | | MaxIntervalFrames |

TSpec

Octet#
21

| DataFramePriority(3bits) | Rank | Reserved(4bit) |
|---|---|---|

PriorityAndRank

Octet#
22

| Accumulated Latency |
|---|

AccumulatedLatency

Octet#
23

| Redundancy(1bit) | Identifier(7bit) |
|---|---|

RedundancyIdentifier

REDUNDANT PATH RESOURCE RESERVATION METHOD, NETWORK DEVICE AND STORAGE MEDIUM

CROSS-REFERENCE TO RELATED APPLICATION

The present disclosure is a National Phase Application filed under 35 U.S.C. 371 as a national stage of PCT/CN2021/104917, filed on Jul. 7, 2021, an application claiming the priority to Chinese Patent Application No. 202010651247.5 filed with the CNIPA on Jul. 8, 2020, the entire contents of which are incorporated herein by reference.

TECHNICAL FIELD

The present application relates to the field of communication technology, and specifically relate to a redundant path resource reservation method, a network device, and a storage medium.

BACKGROUND

The Time Sensitive Networking (TSN) working group of IEEE802.1Q provides services of bounded delay, jitter and extremely low packet loss rate for TSN service streams by the proposed method and mechanism. In the TSN working group standard, when the reliability of the network is improved by providing a packet duplication and elimination mechanism, a redundant service path meeting bandwidth and delay requirements is desired to be planned for the TSN service stream.

In the currently proposed TSN standard draft, a Stream Reservation Protocol (SRP) proposed by the IEEE802.1Qat standard is used for reserving resources and establishing a forwarding path between a TSN service talker and corresponding listeners. However, the existing SRP standard can merely establish a unicast forwarding path meeting the service requirement between the talker and the listener, but cannot provide redundant path resource reservation for TSN service streams.

SUMMARY

The present application provides a redundant path resource reservation method, a network device, and a storage medium.

An embodiment of present application provides a redundant path resource reservation method applicable to a bridge device, including: acquiring, from a received attribute declaration packet of a talker device, a TSN service targeted by the attribute declaration packet and an indication of whether to provide redundant propagation for the attribute declaration packet; duplicating the attribute declaration packet in response to the indication of providing the redundant propagation for the attribute declaration packet, and there are at least two spanning tree instances maintained in the bridge device; propagating, on the basis of the at least two spanning tree instances, the received attribute declaration packet and the duplicated attribute declaration packet, to establish a redundant path for the TSN service between the talker device and a listener device; and performing, in response to receiving a resource reservation request packet for the TSN service from the listener device, redundant path resource reservation for the TSN service.

An embodiment of the present application further provides a redundant path resource reservation method applicable to a talker device, including: generating, in response to determining to provide redundant path resource reservation for a TSN service, a first attribute declaration packet for the TSN service, where the first attribute declaration packet carries an indication of providing redundant propagation for the attribute declaration packet; and sending the first attribute declaration packet to a bridge device connected to the talker device, where at least two spanning tree instances are maintained in the bridge device, and the at least two spanning tree instances are configured to establish a redundant path for the TSN service between the talker device and a designated listener device according to the indication of the first attribute declaration packet.

An embodiment of present application provides a redundant path resource reservation method applicable to a listener device, including: receiving, through a bridge device connected to the listener device, at least two attribute declaration packets for a same TSN service; generating, in response to that the TSN service is a TSN service of interest to the listener device and each received attribute declaration packet is a packet propagated based on a different spanning tree instance, a resource reservation request packet for the TSN service and corresponding to the different spanning tree instance for each received attribute declaration packet, where the different spanning tree instance is one of at least two spanning tree instances maintained in the bridge device connected to the listener device, and the at least two spanning tree instances are configured to establish a redundant path for the TSN service between a talker device and the listener device; and sending, based on the different spanning tree instance corresponding to each generated resource reservation request packet, each resource reservation request packet to the bridge device connected to the listener device.

An embodiment of present application provides a network device, including: one or more processors; and a memory having one or more programs stored thereon which, when executed by the one or more processors, cause the one or more processors to implement the redundant path resource reservation method applicable to a bridge device of the present disclosure.

An embodiment of the present application provides a storage medium having a computer program stored thereon which, when executed by a processor, causes the processor to implement the redundant path resource reservation method of the present disclosure.

With respect to the above embodiments and other aspects of the present application and implementations thereof, further description is provided in the brief description of drawings, the detailed description of embodiments, and the claims.

DETAIL DESCRIPTION OF EMBODIMENTS

Figure 1:
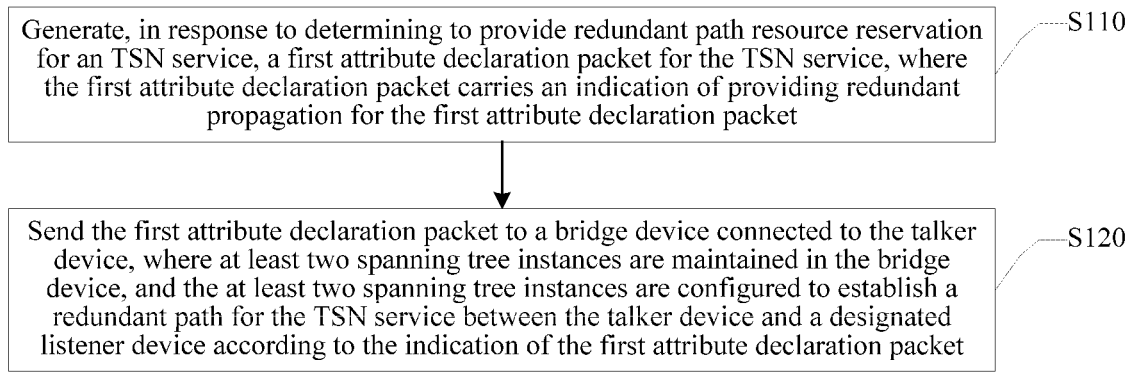
FIG. 1 is a schematic flowchart of a redundant path resource reservation method according to the present application.

For clarity and better understanding of the objects, technical solution and advantages of the application, embodiments of the present application will now be described in detail in conjunction with the accompanying drawings. It should be noted that the embodiments of the present application and features therein may be combined with each other in any manner as long as they are not contradictory.

In the TSN working group standard, the requirements on the quality of service, including bounded delay and jitter, are met through standards 802.1Qbv, 802.1Qch, 802.1Qav and the like; while an extremely low packet loss rate requires high reliability and availability of the network, and possible single node faults and single link faults in the network are desired to be handled as much as possible.

In the TSN working group standard, IEEE802.1CB improves the reliability of the network by providing a packet duplication and elimination mechanism. Specifically, for a corresponding Stream Handle packet, packet redundant transmission is implemented through a duplication operation at a designated port, and elimination and rearrangement operations are performed at a traffic convergent point or receiving point to avoid repeated and disordered packets, which desires a redundant service path meeting bandwidth and delay requirements to be planned for the TSN service stream.

In the currently proposed TSN standard draft, a stream reservation protocol (SRP) proposed in the IEEE802.1Qat standard is used for reserving resources and establishing a forwarding path between a TSN service talker and corresponding listeners. A SRP packet may be propagated in a designated spanning tree.

As an example, the spanning tree may be generated by, for example, a rapid spanning tree protocol, or may be established by, for example, a Path Control Reservation (PCR) protocol proposed in IEEE802.1Qca. When the PCR protocol is adopted, all links contained in the designated spanning tree may be displayed.

As an example, in a Multiple Registration Protocol (MRP), a spanning tree instance may be designated by an identifier. Specifically, the SRP packet may run in a basic spanning tree instance designated by a default ID. Since the SRP packet is propagated in the spanning tree instance, there is merely one possible forwarding path between the talker and one listener, so that a unicast forwarding path meeting the service requirement can be established between the talker and one listener at most. Therefore, based on the existing SRP standard, it is impossible to provide redundant path resource reservation for TSN service streams.

In addition, in other TSN-related standard drafts, such as IEEE802.1Qcc, merely configuration of traffic shaping and service stream features, and configuration extension of the basic SRP are implemented now. For example, at most 7 stream reservation categories are supported. However, no extension method for redundant path resource collection, computation and path delivery has been proposed yet. In other standard protocols and solutions, no explicit solution has been proposed, either.

The present application provides a redundant path resource reservation method, which can carry a redundancy field and a spanning tree identifier through an extended SRP-based attribute declaration packet, indicate, by a value of the redundancy field, that a redundant path is desired to be established for the packet in the network, indicate, by the spanning tree identifier, a spanning tree instance based on which the attribute declaration packet is transmitted in a bridge device, and take a bridge port connected to the talker as an agent of the redundant path function, increase parsing of the redundancy field, duplicate and modify the attribute declaration packet of the talker when it is determined that the value of the redundancy field indicates establishing a redundant path for the packet in the network, and propagate the packets in two different spanning tree instances, thereby establishing a redundant service protective path for the TSN service.

FIG. 1 is a schematic flowchart of a redundant path resource reservation method according to the present application. As shown in FIG. 1, the redundant path resource reservation method of the present application may be applied to a talker device, and the method may include the following operations S110 to S120.

At operation S110, generating, in response to determining to provide redundant path resource reservation for a TSN service, a first attribute declaration packet for the TSN service, where the first attribute declaration packet carries an indication of providing redundant propagation for the first attribute declaration packet.

At operation S120, sending the first attribute declaration packet to a bridge device connected to the talker device, where at least two spanning tree instances are maintained in the bridge device, and the at least two spanning tree instances are configured to establish a redundant path for the TSN service between the talker device and a designated listener device according to the indication of the first attribute declaration packet.

In the present application, a talker device (i.e., a TSN service talker) may indicate, through an attribute declaration packet, that redundant propagation is desired to be provided for the attribute declaration packet, and send the attribute declaration packet to a bridge device connected thereto, so that the bridge device provides redundant propagation for the attribute declaration packet according to at least two spanning tree instances maintained, thereby establishing a redundant path for a TSN service between the talker device and a designated listener device.

In an implementation, operation S110 may include: generating a first attribute declaration packet for the TSN service. The first attribute declaration packet carries a stream ID for identifying the TSN service, redundancy information taking a first redundancy information value, and a spanning tree identifier taking a value of any. The first redundancy information value is configured to indicate providing redundant propagation for the first attribute declaration packet, and the value of any is configured to indicate a spanning tree instance on which propagation of the first attribute declaration packet is based.

In an implementation, in response to determining not to provide redundant path resource reservation for the TSN service, the method may further include: generating a second attribute declaration packet for the TSN service. The second attribute declaration packet carries a stream ID for identifying the TSN service, redundancy information taking a second redundancy information value, and a spanning tree identifier taking a preset identifier value. The second redundancy information value is configured to indicate not providing redundant propagation for the second attribute declaration packet, and the preset identifier value is configured to indicate a spanning tree instance on which propagation of the second attribute declaration packet is based.

In the present application, the talker device may extend an SRP-based talker packet to carry a stream ID, a Redundancy field, and an Identifier field, where the stream ID is configured to uniquely identify a TSN service, redundancy information in the redundancy field is configured to indicate a redundant propagation requirement for an attribute declaration packet, the spanning tree identifier in the Identifier field is configured to indicate a spanning tree instance on which propagation of the attribute declaration packet in the bridge device is based; and send the attribute declaration packet for the TSN service according to the spanning tree instance indicated by the spanning tree identifier, so as to perform redundant path resource reservation for the TSN service identified by the stream ID.

In the present application, at least two spanning tree instances may be established in advance in the TSN network, where one of the spanning tree instances may be used as a primary spanning tree instance, and a spanning tree instance other than the primary spanning tree instance may be used as a standby spanning tree instance. In order to establish a redundant path, link sets of the primary and standby spanning trees corresponding to the primary and standby spanning tree instances should contain as few repeated links as possible. Exemplarily, the spanning tree link sets may be established by means of PCR, thereby establishing a satisfactory spanning tree instance. It will be appreciated that other methods may also be used in the process of establishing the primary and standby spanning tree instances, which is not specifically limited in the present application.

In an implementation, for established primary and standby spanning tree instances, spanning tree identifiers corresponding to the spanning tree instances may be maintained in the bridge by the MRP. As an example, if a spanning tree identifier value corresponding to a spanning tree instance is set to 0, it indicates that forwarding is performed according to a default or preset spanning tree instance.

In the present application, one primary spanning tree instance and at least one standby spanning tree instance may be established. For simplicity of description, the processes of providing redundant propagation for the attribute declaration packet and reserving resources for the redundant path are described herein by taking the case of establishing one primary spanning tree instance and one standby spanning tree instance established through PCR as an example. However, this description is not to be interpreted as limiting the scope or implementation possibilities of the technical solution of the present application, and the processing method of one primary spanning tree instance and more than one standby spanning tree instance is substantially the same as the processing method of one primary spanning tree instance and one standby spanning tree instance.

Figure 2:
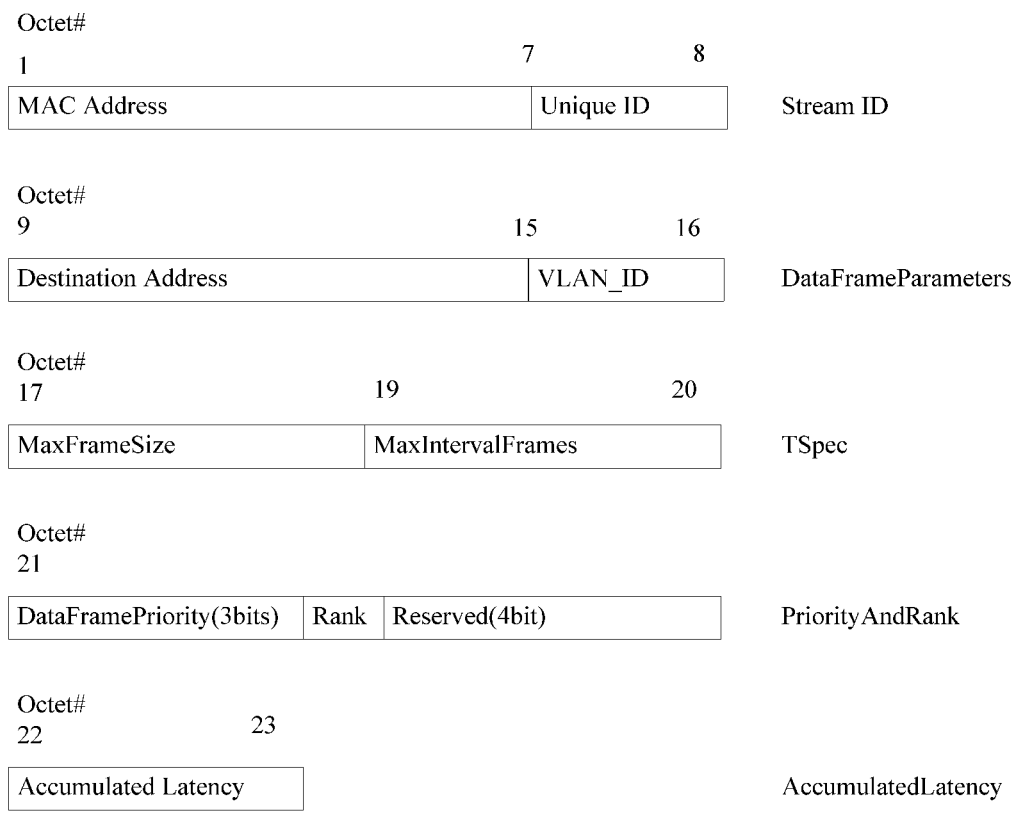
FIG. 2 is a schematic diagram illustrating an encoding format of an exemplary SRP-based attribute declaration packet.

FIG. 2 is a schematic diagram illustrating an encoding format of an exemplary SRP-based attribute declaration packet. As shown in FIG. 2, the existing SRP-based attribute declaration packet may include: an MAC Address, a Unique ID, a Destination Address, a VLAN_ID, a Max Frame Size, a Max Interval Frame, a Data Frame Priority, a Rank, a reserved field (Reserved) and Accumulated Latency.

The MAC Address and the Unique ID may be used as the Stream ID of the attribute declaration packet, the Destination Address and the VLAN_ID may be used as Data Frame Parameters of the attribute declaration packet, the Max Frame Size and the Max Interval Frame may be used as a traffic specification (TSprc) of the attribute declaration packet, and the Data Frame Priority, the Rank, and the Reserved may be used as the priority and the rank of the attribute declaration packet.

Figures 3, 4:
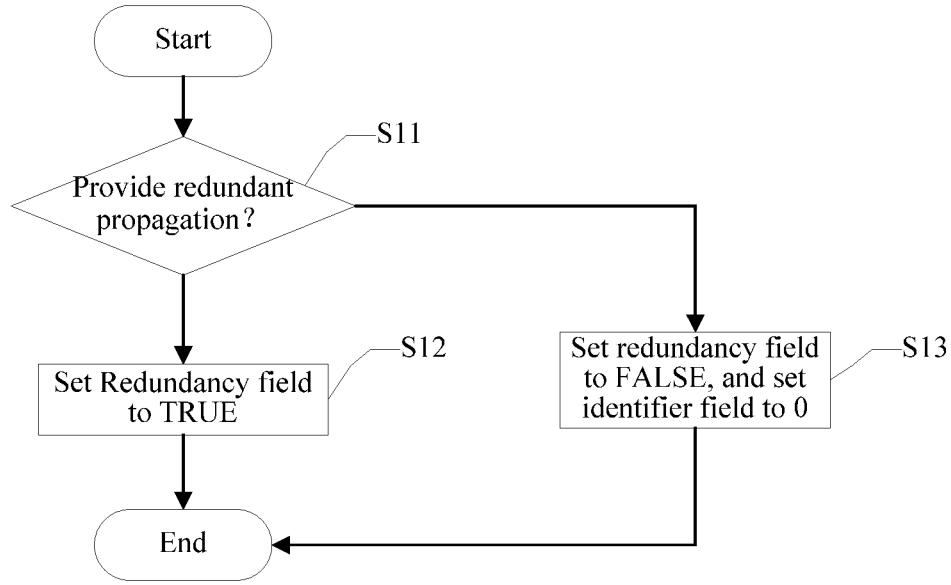
FIG. 3 is a schematic diagram illustrating an encoding format of an extended SRP-based attribute declaration packet according to the present application.
FIG. 4 is a schematic flowchart illustrating initialization setting of an attribute declaration packet by a talker device according to the present application.

FIG. 3 is a schematic diagram illustrating an encoding format of an extended SRP-based attribute declaration packet according to the present application. As shown in FIG. 3, the extended SRP-based attribute declaration packet carries a Redundancy field and a spanning tree identifier (Identifier) field.

As shown in FIG. 3, in an example format of an SRP-based attribute declaration packet generated by a talker device, the Redundancy field may occupy, for example, 1 bit. When the Redundancy field value is 1, it indicates that redundancy protection is desired; and otherwise, when the Redundancy field is 0, it indicates that redundancy protection is not desired. The Identifier field takes, for example, 7 bits, and a maximum number of supported spanning tree instances is 128.

It should be understood that the lengths of the Redundancy field and the Identifier field in the present application may be flexibly designated according to the requirements of the actual application scenario, and examples shown in this embodiment are merely for illustration and are not intended to limit the content of the present application.

In an implementation, before operation S120, the method may further include: setting, in response to determining to provide redundant propagation for the attribute declaration packet, the redundancy information to a first redundancy information value, and the spanning tree identifier to any; and setting, in response to determining not to provide redundant propagation for the attribute declaration packet, the redundancy information to a second redundancy information value, and the spanning tree identifier to a preset identifier value. The second redundancy information value is different from the first redundancy information value.

As an example, the first redundancy information value may be TRUE, the second redundancy information value may be FALSE, and the preset identifier value of the spanning tree identifier may be set to 0 by default.

In the present application, after extension, two fields are added to the attribute declaration packet generated by the talker device, which are referred to as a Redundancy field and an Identifier field. The Redundancy field is configured to indicate a redundant propagation requirement for an attribute declaration packet, i.e., whether redundant propagation is desired to be provided for the talker attribute declaration packet. Exemplarily, if the Redundancy field value is TRUE, it indicates that redundant propagation is desired, and if the Redundancy field value is FALSE, it indicates that redundant propagation is not desired. The Identifier field is configured to indicate on which spanning tree instance propagation of the talker attribute declaration packet in the bridge is based.

In the present application, various triggering mechanisms for the redundant path resource reservation of the TSN service stream may be adopted. For example, as described above, the process of redundant path resource reservation for the TSN service stream is triggered by an SRP packet sent from the talker device, where the talker device has an SRP capability. In other implementation examples, the bridge may be configured in a configuration manner to trigger sending of the SRP packet; or a designated service packet may be used to trigger a bridge port directly connected to the talker device to start the resource reservation process, where the bridge port is desired to be configured in a redundancy mode or not in advance.

FIG. 4 is a schematic flowchart illustrating initialization setting of an attribute declaration packet by a talker device according to the present application. As shown in FIG. 4, the initialization setting of the attribute declaration packet by the talker device may include the following operations S11 to S13.

At operation S11, the talker device determines whether to provide redundant propagation for the attribute declaration packet.

At operation S12, if it is determined to provide redundant propagation, the Redundancy field of the talker attribute declaration packet is set to TRUE, and the spanning tree identifier value may be set to any.

At operation S13, if it is determined not to establish a redundant path, the Redundancy field is set to FALSE, and the spanning tree identifier field is set to 0, which indicates that the packet is propagated based on a preset spanning tree instance.

Through the above operations S11 to S13, the talker device completes the initialization setting of the content carried in the attribute declaration packet according to whether to provide redundant propagation for the attribute declaration packet.

According to the redundant path resource reservation method of the present application, the talker device may extend an SRP-based talker packet to carry a Redundancy field and an Identifier field, indicate, through the Redundancy field, whether to provide redundant propagation for the attribute declaration packet, and send, according to the spanning tree instance indicated by the spanning tree identifier, the attribute declaration packet for the TSN service to a bridge port directly connected to the talker device, to trigger the redundant path resource reservation for the TSN service identified by the stream ID.

Figure 5:
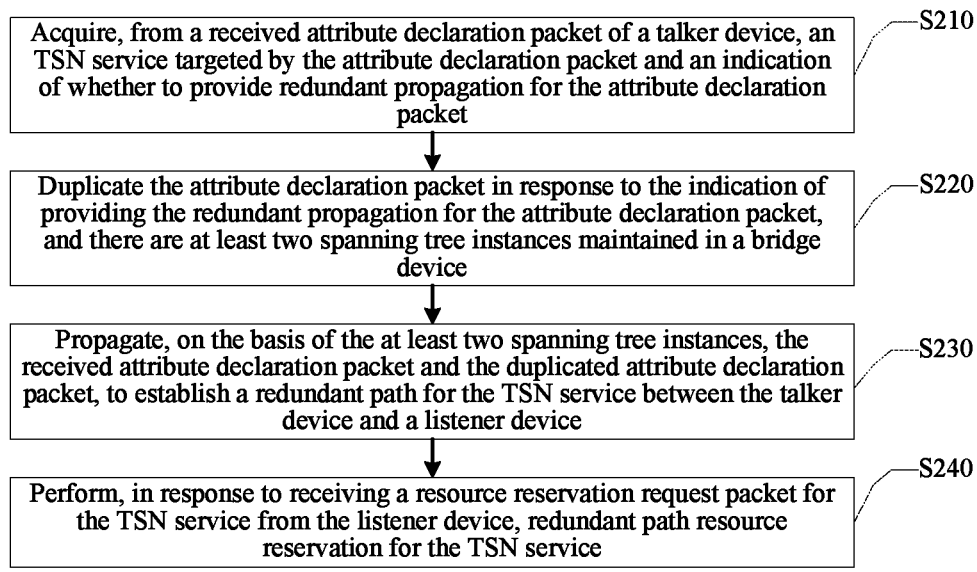
FIG. 5 is another schematic flowchart of the redundant path resource reservation method according to the present application.

FIG. 5 is another schematic flowchart of the redundant path resource reservation method according to the present application. As shown in FIG. 5, the redundant path resource reservation method of the present application may be applied to a bridge device, and the method may include the following operations S210 to S240.

At operation S210, acquiring, from a received attribute declaration packet of a talker device, a TSN service targeted by the attribute declaration packet and an indication of whether to provide redundant propagation for the attribute declaration packet.

At operation S220, duplicating the attribute declaration packet in response to the indication of providing the redundant propagation for the attribute declaration packet, and there are at least two spanning tree instances maintained in a bridge device.

At operation S230, propagating, on the basis of the at least two spanning tree instances, the received attribute declaration packet and the duplicated attribute declaration packet, to establish a redundant path for the TSN service between the talker device and a listener device.

At operation S240, performing, in response to receiving a resource reservation request packet for the TSN service from the listener device, redundant path resource reservation for the TSN service.

According to the redundant path resource reservation method of the present application, the bridge device acquires, from the received SRP-based attribute declaration packet, redundancy information and spanning tree instances, if the redundancy information indicates providing redundant propagation for the attribute declaration packet and the number of corresponding spanning tree instances in the bridge device is greater than a preset value, the attribute declaration packet is duplicated and modified according to the corresponding spanning tree instances, so that the received attribute declaration packet and the duplicated attribute declaration packet can be propagated in different spanning tree instances, thereby establishing a redundant service protective path for the TSN service.

In operation S210, a spanning tree identifier may be configured to identify a spanning tree instance, and spanning tree topology information may be determined from spanning tree instances, so as to determine a bridge forwarding link corresponding to the spanning tree topology information.

In an implementation, the received attribute declaration packet carries a stream ID and redundancy information, and the operation S210 may include: taking a TSN service indicated by the stream ID carried in the received attribute declaration packet as the TSN service targeted by the attribute declaration packet; determining, in response to the redundancy information taking a first redundancy information value, to provide redundant propagation for the attribute declaration packet; and determining, in response to the redundancy information taking a second redundancy information value, not to provide redundant propagation for the attribute declaration packet. The second redundancy information value is different from the first redundancy information value.

In an implementation, in response to determining to provide redundant propagation for the attribute declaration packet, the operation S230 may include: modifying, according to spanning tree identifiers of the acquired at least two spanning tree instances, a spanning tree identifier in the received attribute declaration packet and a spanning tree identifier in the duplicated attribute declaration packet into different spanning tree identifiers; modifying each of the redundancy information in the received attribute declaration packet and the redundancy information in the duplicated attribute declaration packet into the second redundancy information value; and propagating the received attribute declaration packet and the duplicated attribute declaration packet in different spanning tree instances according to the modified different spanning tree identifiers, to establish the redundant path for the TSN service.

In an implementation, when the redundancy information has a first redundancy information value, it indicates providing redundant propagation; and when the redundancy information has the second redundancy information value, it indicates not providing redundant propagation.

Exemplarily, the corresponding spanning tree identifier values of a primary spanning tree instance and a standby spanning tree instance established by PCR may be set to a and b in the bridge device, respectively. For example, the spanning tree identifier in the received attribute declaration packet may be set to a, and the spanning tree identifier in the duplicated attribute declaration packet may be set to b.

In an implementation, if it indicates providing redundant propagation for the attribute declaration packet, and less than two spanning tree instances are maintained in the bridge device, the method may further include: setting an indication of not providing redundant propagation for the received attribute declaration packet, and propagating the received attribute declaration packet based on a preset spanning tree instance in the spanning tree instances maintained in the bridge device.

In an implementation, the above operations may include: setting a spanning tree identifier carried in the received attribute declaration packet as a preset identifier value that is configured to indicate the preset spanning tree instance; setting redundancy information carried in the received attribute declaration packet as the second redundancy information value that is configured to indicate not providing redundant propagation for the attribute declaration packet; and propagating, based on the preset spanning tree instance, an attribute declaration packet carrying the second redundancy information value and the preset identifier value.

Through the above operations, if the redundancy information in the attribute declaration packet received by the bridge device indicates providing redundant propagation for the attribute declaration packet, but the number of corresponding spanning tree instances in the bridge device is not sufficient to provide the redundant propagation, the redundancy information in the attribute declaration packet may be modified to the second redundancy information value that indicates not providing redundant propagation for the attribute declaration packet, and the attribute declaration packet is forwarded according to the spanning tree instance (default spanning tree instance) indicated by the preset identifier value.

In an implementation, if the received attribute declaration packet indicates not providing redundant propagation for the attribute declaration packet, the method may further include: forwarding the received attribute declaration packet based on the spanning tree instance indicated by the spanning tree identifier carried in the received attribute declaration packet.

If the redundancy information has the second redundancy information value, it indicates not providing redundant propagation for the attribute declaration packet, i.e., not duplicating and modifying the attribute declaration packet.

In an implementation, after acquiring the redundancy information and the spanning tree identifier carried in the attribute declaration packet, the method may further include: registering attribute information contained in the received attribute declaration packet at a port of the bridge device where the attribute declaration packet is received.

By registering the packet attribute of the attribute declaration packet, the packet attribute can be dynamically forwarded and transmitted between bridge devices, so that the purposes of reducing manual configuration by a network administrator and ensuring correct network attribute configuration are achieved.

Figure 6:
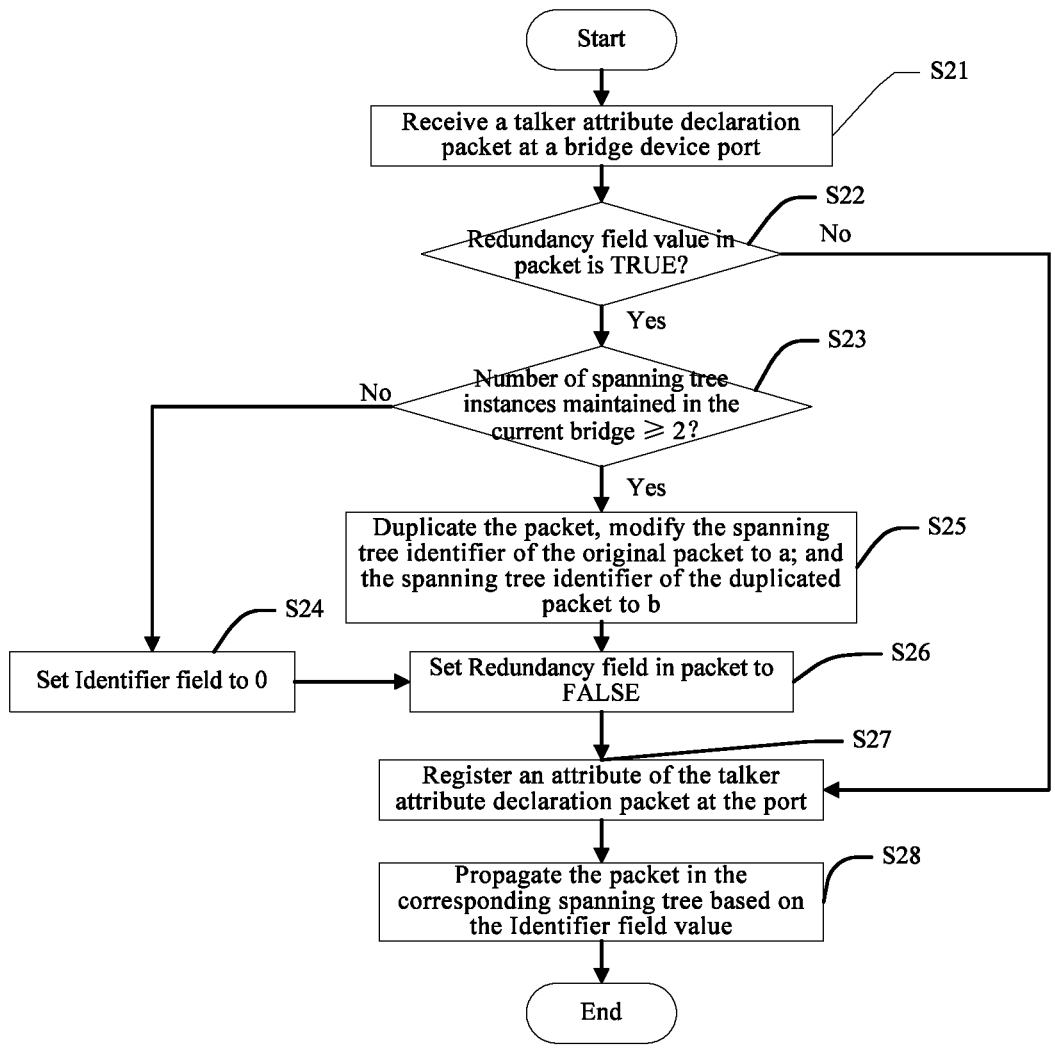
FIG. 6 is a schematic flowchart of processing an attribute declaration packet by a bridge device according to the present application.

FIG. 6 is a schematic flowchart of processing an attribute declaration packet by a bridge device according to the present application. As shown in FIG. 6, the processing of the attribute declaration packet by the bridge device may include the following operations S21 to S28.

At operation S21, receiving a talker attribute declaration packet at a bridge device port.

At operation S22, parsing a Redundancy field in the talker attribute declaration packet, and determining whether the Redundancy field of the packet is TRUE. If it is TRUE, proceed to operation S23, and otherwise, proceed to operation S27.

At operation S23, determining the number of spanning tree instances maintained in the current bridge. If the number is greater than or equal to 2, proceed to operation S25, and otherwise, proceed to operation S24.

At operation S24, setting a spanning tree identifier in the attribute declaration packet to 0.

At operation S25, duplicating the talker attribute declaration packet, taking the original packet as a primary packet and the duplicated packet as a standby packet, and setting a spanning tree identifier of the primary packet and a spanning tree identifier of the standby packet.

For example, an Identifier field of the primary packet is set to a; and an Identifier field of the standby packet is set to b.

At operation S26, setting the Redundancy field value of the talker attribute declaration packet to FALSE.

At operation S27, registering an attribute of the talker attribute declaration packet at the port.

At operation S28, transmitting the attribute declaration packet in the corresponding spanning tree based on the Identifier field value carried in the talker attribute declaration packet.

Through the above operations S21 to S28, the talker attribute declaration packet is received at a certain port of the bridge device, and the registration and propagation processes of the modified attribute declaration packet are implemented.

In an implementation, operation S240 may include: receiving a resource reservation request packet from the listener device through a first port, where the resource reservation request packet carries a stream ID and a spanning tree identifier, and the first port is any one of a plurality of ports of the bridge device; reserving, in response to that a bandwidth of the first port meets a preset bandwidth requirement and the number of first resource reservation requests is zero, bandwidth resources for a TSN service indicated by the stream ID carried in the resource reservation request packet, and establishing a forwarding table entry, where the number of first resource reservation requests is the number of resource reservation requests for the TSN service received at the first port, which is recorded in the bridge device in advance.

Through the above operations, when the bandwidth of a same port meets the preset bandwidth requirement and the recorded number of resource reservation requests for a resource reservation request packet of a certain stream ID at the port is zero, bandwidth resources are reserved for the TSN service indicated by the stream ID and a forwarding table entry is established. In other words, when resource reservation of a same stream ID is received at a same port, the port does not reserve multiple resources, and a duplicated packet elimination function can be executed here.

Table 1 below shows an example of the number of resource reservation requests corresponding to service streams at each port recorded in the bridge device according to the present application.

TABLE 1

Number of resource reservation requests corresponding to service streams in each port of a bridge device

| Port No. | Stream ID | Number of resource reservation requests |
|---|---|---|
| fei-0/1/0/1 | 1 | 4 |
| spi-0/2/0/2 | 2 | 2 |
| fei-0/1/0/2 | 1 | 4 |
| fei-0/1/0/3 | 4 | 1 |

As can be seen from Table 1, the bridge device may maintain the number of resource reservation requests received at each port for each service stream, so as to update or cancel resource reservation for a same stream ID (S-ID) under a same port. It should be noted that, when resource reservation of a same stream ID is received at a same port, a corresponding number of resource reservation requests are recorded, but the port does not reserve multiple resources, and a duplicated packet elimination function is executed here.

In an implementation, after the operation S240, or when the bandwidth of the first port meets the preset bandwidth requirement and the number of first resource reservation requests is greater than or equal to 1, the method may further include: adding 1 to the recorded number of first resource reservation requests, to obtain an updated number of first resource reservation requests; and forwarding the resource reservation request packet based on the spanning tree instance indicated by the spanning tree identifier carried in the resource reservation request packet.

The fact that the number of first resource reservation requests is greater than or equal to 1 indicates that the port has reserved resources and established a forwarding table entry for the currently received service stream. Therefore, after the corresponding number of first resource reservation requests is updated, the operations of reserving resources and establishing a forwarding table entry are not performed any more.

In an implementation, if the bandwidth of the first port does not meet the preset bandwidth requirement, the method may further include: forwarding the resource reservation request packet based on the spanning tree instance indicated by the spanning tree identifier carried in the resource reservation request packet.

Figure 7:
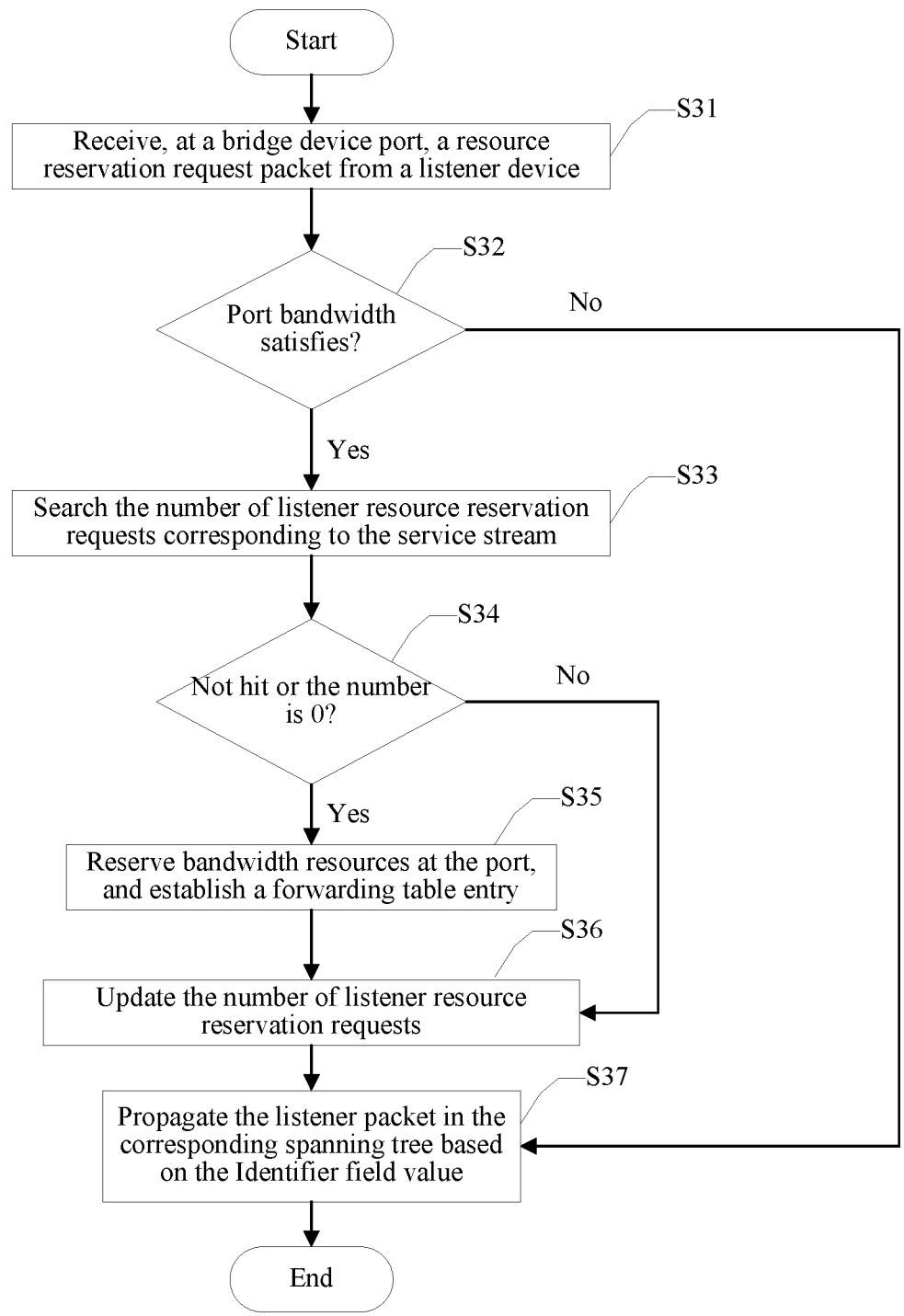
FIG. 7 is a schematic processing flow of receiving an attribute declaration packet by a bridge device according to the present application.

FIG. 7 is a schematic processing flow of receiving an attribute declaration packet by a bridge device according to the present application. As shown in FIG. 7, the processing flow of the bridge device receiving the attribute declaration packet may include the following operations S31 to S37.

At step S31, receiving, at a bridge device port, a resource reservation request packet from a listener device.

At step S32, calculating a desired bandwidth according to the talker attribute declaration of a corresponding stream ID at the port, and determining whether the bandwidth resource at the port meets the bandwidth requirement. If the bandwidth resource at the port meets the bandwidth requirement, proceed to operation S33, and otherwise, proceed to operation S37.

At operation S33, searching the number of resource reservation requests corresponding to the service stream at each port maintained by the bridge device.

At operation S34, proceeding to operation S35 if no search result is hit or the corresponding number is 0, and otherwise, proceeding to operation S36.

At operation S35, reserving bandwidth resources at the port, and establishing a forwarding table entry.

At operation S36, updating the number of resource reservation requests corresponding to the service stream at each port, so that the number of listener resource reservation requests corresponding to the stream ID is added by 1.

At operation S37, parsing the Identifier field carried in the packet, and further propagating the listener packet in the corresponding spanning tree.

Through the above operations S31 to S37, when receiving a listener resource reservation request packet, the port of the bridge device may perform the processing flow of reserving bandwidth and establishing a forwarding table entry.

In an implementation, the redundant path resource reservation method further includes: receiving a resource reservation cancellation packet from the listener device through the first port, where the resource reservation cancellation packet carries a stream ID of the TSN service and a spanning tree identifier; subtracting 1 from the recorded number of first resource reservation requests, to obtain an updated number of first resource reservation requests; deleting, in response to that the updated number of first resource reservation requests is zero, the forwarding table entry of the TSN service and releasing the reserved bandwidth resources for the TSN service, and forwarding the resource reservation cancellation packet according to a spanning tree instance indicated by the spanning tree identifier carried in the resource reservation cancellation packet; and forwarding, in response to that the updated number of first resource reservation requests is greater than or equal to 1, the resource reservation cancellation packet according to the spanning tree instance indicated by the spanning tree identifier carried in the resource reservation cancellation packet.

Figure 8:
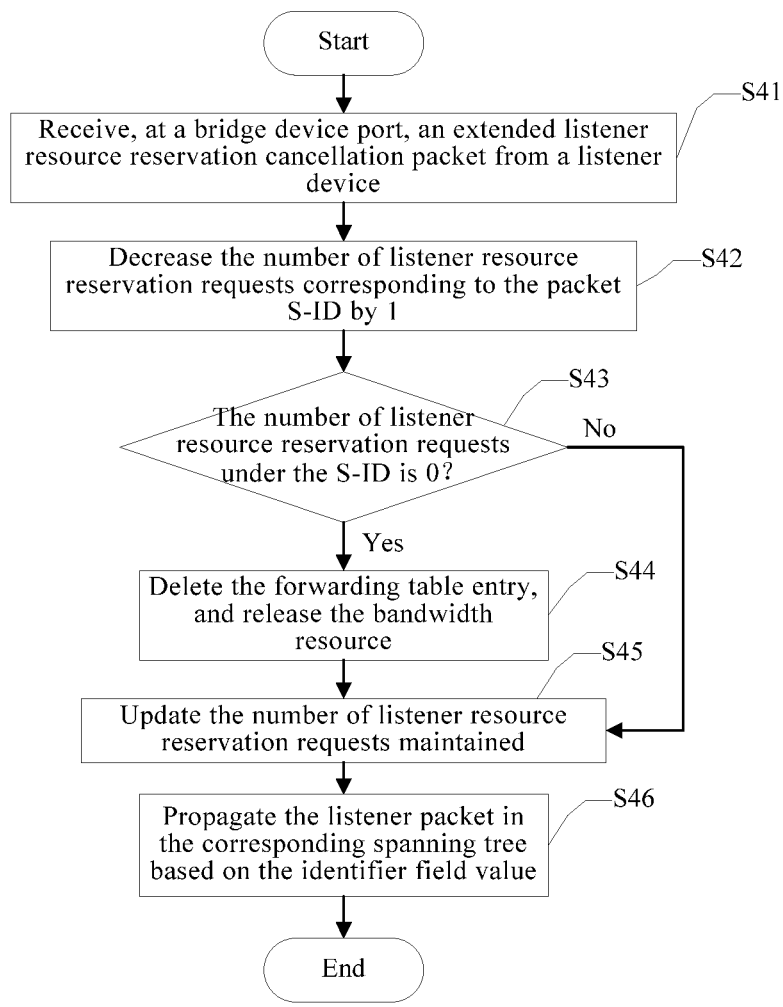
FIG. 8 is a schematic processing flow of receiving a resource reservation cancellation packet by a bridge device according to the present application.

FIG. 8 is a schematic processing flow of receiving a resource reservation cancellation packet by a bridge device according to the present application. As shown in FIG. 8, the processing flow of the bridge device receiving the resource reservation cancellation packet may include the following operations S41 to S46.

At operation S41, receiving, at a bridge device port, a resource reservation cancellation packet from a listener device.

At operation S42, decreasing the number of resource reservation requests corresponding to the service stream at the port maintained by the bridge device by 1.

At operation S43, determining whether the number of resource reservation requests corresponding to the service stream at the port in the bridge device is 0. If the number of resource reservation requests corresponding to the service stream at the port in the bridge device is 0, proceed to step S44, and otherwise, proceed to operation S45.

At operation S44, deleting the forwarding table entry, and releasing the bandwidth resource.

At operation S45, updating the number of resource reservation requests corresponding to the service stream maintained at the port of the bridge device.

At operation S46, propagating, based on the spanning tree instance indicated by the spanning tree identifier in the resource reservation cancellation packet, the resource reservation cancellation packet in the corresponding spanning tree.

Through the above operations S41 to S46, when receiving a resource reservation cancellation packet sent from the listener, the port of the bridge device is desired to search for the number of resource reservation requests corresponding to the service stream at each port, decrease the number of listener resource reservation requests corresponding to the stream ID carried in the packet in the table entry by 1, and delete the forwarding table entry and release the corresponding bandwidth resource if and only if a registration number of attributes of the listener corresponding to the stream ID in the table is 0.

Figure 9:
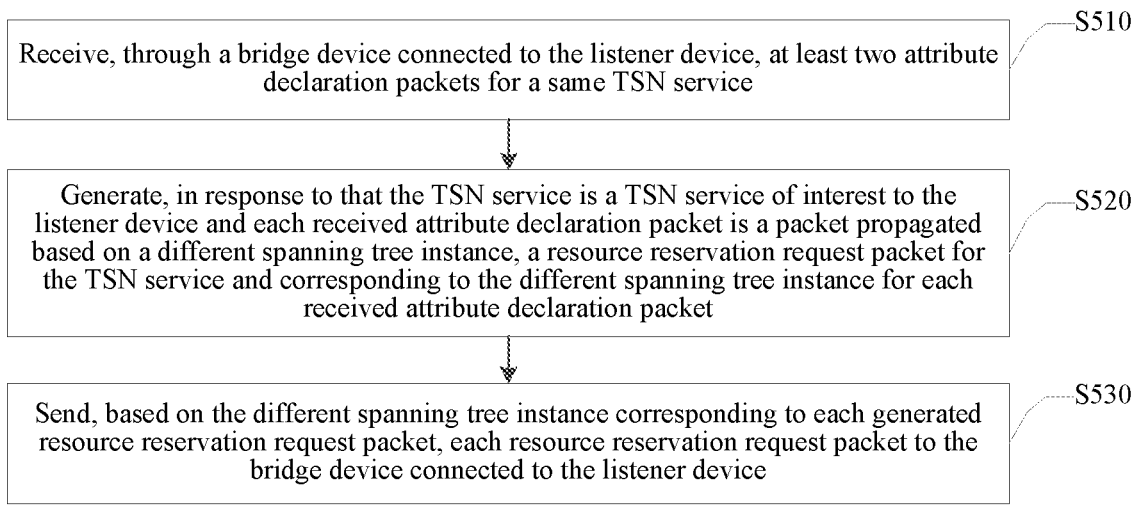
FIG. 9 is another schematic flowchart of the redundant path resource reservation method according to the present application.

FIG. 9 is another schematic flowchart of the redundant path resource reservation method according to the present application. As shown in FIG. 9, the redundant path resource reservation method may be applied to a listener device, and may include the following operations S510 to S530.

At operation S510, receiving, through a bridge device connected to the listener device, at least two attribute declaration packets for a same TSN service.

After operation S510, the method may further include: acquiring a stream ID and a spanning tree identifier carried in each attribute declaration packet. The stream ID is configured to identify the TSN service, and the spanning tree identifier is configured to indicate a spanning tree instance on which propagation of the attribute declaration packet in the bridge device is based.

The attribute declaration packet further carries redundancy information for indicating a redundant propagation requirement for the attribute declaration packet when the attribute declaration packet is propagated in the bridge device.

At operation S520, generating, in response to that the TSN service is a TSN service of interest to the listener device and each received attribute declaration packet is a packet propagated based on a different spanning tree instance, a resource reservation request packet for the TSN service and corresponding to the different spanning tree instance for each received attribute declaration packet. In this operation, the different spanning tree instance is one of at least two spanning tree instances maintained in the bridge device connected to the listener device, and the at least two spanning tree instances are configured to establish a redundant path for the TSN service between a talker device and the listener device.

In an implementation, the operation of generating the resource reservation request packet for the TSN service and corresponding to the different spanning tree instance may include: carrying a stream ID for identifying the TSN service and a spanning tree identifier corresponding to the different spanning tree instance in the resource reservation request packet.

At operation S530, sending, based on the different spanning tree instance corresponding to each generated resource reservation request packet, each resource reservation request packet to the bridge device connected to the listener device.

According to the redundant path resource reservation method of the present application, the SRP-based resource reservation request packet of the listener device is also desired to be extended to carry an Identifier field, which indicates on which spanning tree instance propagation of the listener packet in the bridge is based. Upon receiving the attribute declaration packet corresponding to the stream ID, the listener device firstly extracts a value of the Identifier field carried in the attribute declaration packet, and writes the value of the Identifier field into the Identifier field of the listener packet, and then makes a resource reservation request.

Figure 10:
FIG. 10 is a schematic diagram illustrating an encoding format of an existing SRP-based listener packet.

FIG. 10 is a schematic diagram illustrating an encoding format of an existing SRP-based listener packet. As shown in FIG. 10, in an existing SRP-based listener packet, an MAC Address and a Unique ID form a Stream ID in the attribute cancellation packet, so as to uniquely identify a TSN service stream.

In an implementation, after the operation S530, the method may further include: recording a stream ID and a corresponding spanning tree identifier carried in each received attribute declaration packet. The spanning tree identifier is configured to indicate a spanning tree instance on which propagation of the attribute declaration packet in the bridge device is based.

Figure 11:
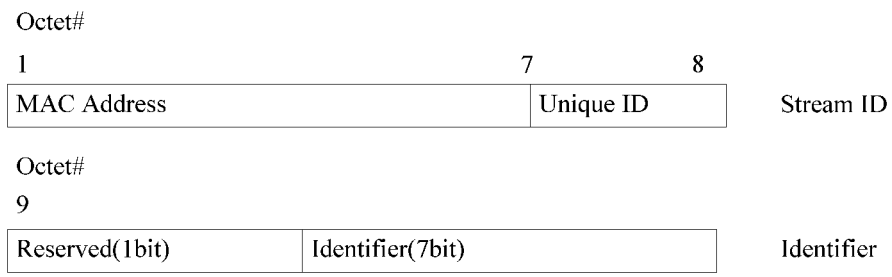
FIG. 11 is a schematic diagram illustrating an encoding format of a listener packet according to the present application.

FIG. 11 is a schematic diagram illustrating an encoding format of a listener packet according to the present application. As shown in FIG. 11, the listener packet may carry an Identifier field. In other words, a new byte, which contains the Identifier field, is added to the existing listener packet. The Identifier field in the listener packet may have a same length as the Identifier field in the attribute declaration packet generated at the talker. For example, in the newly added one byte, the length of the Identifier field may be 7 bits, and an additional 1 bit may be used as a reserved field.

It should be understood that the length of the Identifier field carried in the listener packet may be flexibly designated according to the actual application scenario requirement, and the example shown in the present application is merely for explanation but not limitation to the present application.

Figure 12:
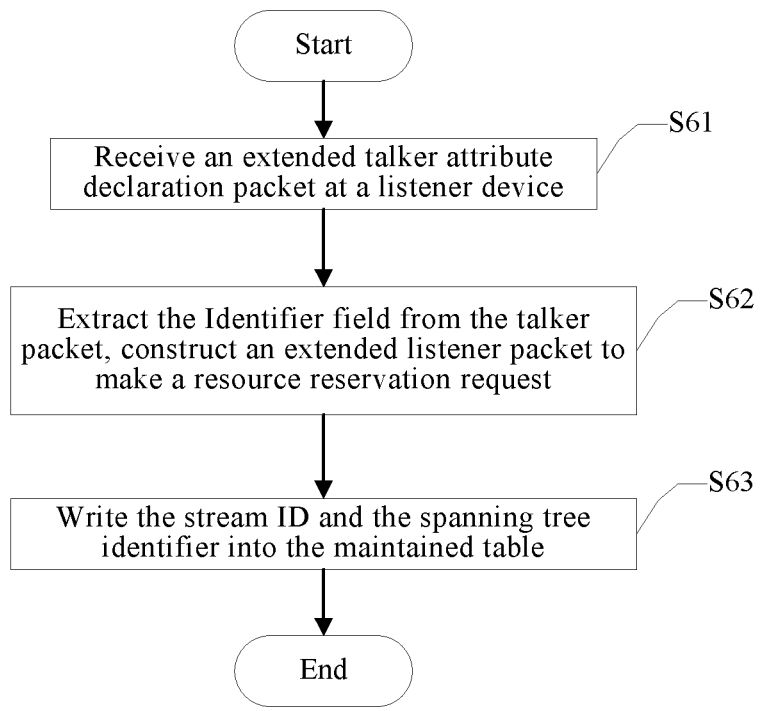
FIG. 12 is a schematic processing flow of receiving an attribute declaration packet by a listener device according to the present application.

FIG. 12 is a schematic processing flow of receiving an attribute declaration packet by a listener device according to the present application. As shown in FIG. 12, the processing flow of the attribute declaration packet may include the following operations S61 to S63.

At operation S61, receiving the attribute declaration packet at a listener device.

At operation S62, constructing and sending, using the spanning tree identifier information extracted from the attribute declaration packet, a listener resource reservation request packet to make a resource reservation request.

At operation S63, recording the stream ID and the spanning tree identifier in the resource reservation request.

Through the above operations S61 to S63, the packet generated at the listener device may be a resource reservation request packet or a resource reservation cancellation packet. The listener device sends a resource reservation request packet carrying the stream ID and the spanning tree identifier, to request resource reservation for a designated TSN service configuration.

When the listener packet is the resource reservation cancellation packet, the resource reservation cancellation packet carrying spanning tree identifier information can be generated by expanding an encoding format of the SRP-based resource reservation cancellation packet in the listener device to request cancellation of resources allocated to the redundant path.

Table 2 below shows an example of a mapping relationship between stream IDs and spanning tree identifiers in a listener device according to the present application.

TABLE 2

Mapping relationship between stream IDs and
spanning tree identifiers in listener device

| Stream ID | Number of resource reservation requests |
|---|---|
| 1 | {0} |
| 2 | {1, 2} |
| 1 | {0} |
| 4 | {2, 3} |

As can be seen from Table 2, the information table of stream IDs and the corresponding spanning tree identifiers may be maintained in the listener device, so that redundant path resources can be released when the listener actively cancels the resource reservation.

In an implementation, the redundant path resource reservation method may further include: acquiring, in response to determining to provide resource cancellation for the TSN service, the stream ID of the TSN service and the corresponding spanning tree identifier from the pre-recorded stream IDs and corresponding spanning tree identifiers; generating a corresponding resource reservation cancellation packet for each spanning tree identifier corresponding to the TSN service, where the resource reservation cancellation packet carries a stream ID of the TSN service and one spanning tree identifier corresponding to the TSN service; sending each resource reservation cancellation packet based on a spanning tree instance indicated by the spanning tree identifier carried in each generated resource reservation cancellation packet; and deleting preset information from the pre-recorded stream IDs and corresponding spanning tree identifiers, where the preset information is the stream ID and the corresponding spanning tree identifier carried in the sent resource reservation cancellation packet.

Through the above operations, when the listener device cancels the resource reservation, the mapping relationship between the stream IDs and the spanning tree identifiers is searched to obtain a set of spanning tree identifier values of the listener corresponding to a certain service stream, and then a resource reservation cancellation packet is constructed for each spanning tree identifier value and sent out.

According to the redundant path resource reservation method of the present application, when receiving an SRP-based attribute declaration packet for a TSN service, the listener device may extract a stream ID and a spanning tree identifier carried in the attribute declaration packet and generate a resource reservation request packet which carries the stream ID and the spanning tree identifier to make a resource reservation request, thereby establishing a redundant service protective path for the TSN service.

Figure 13:
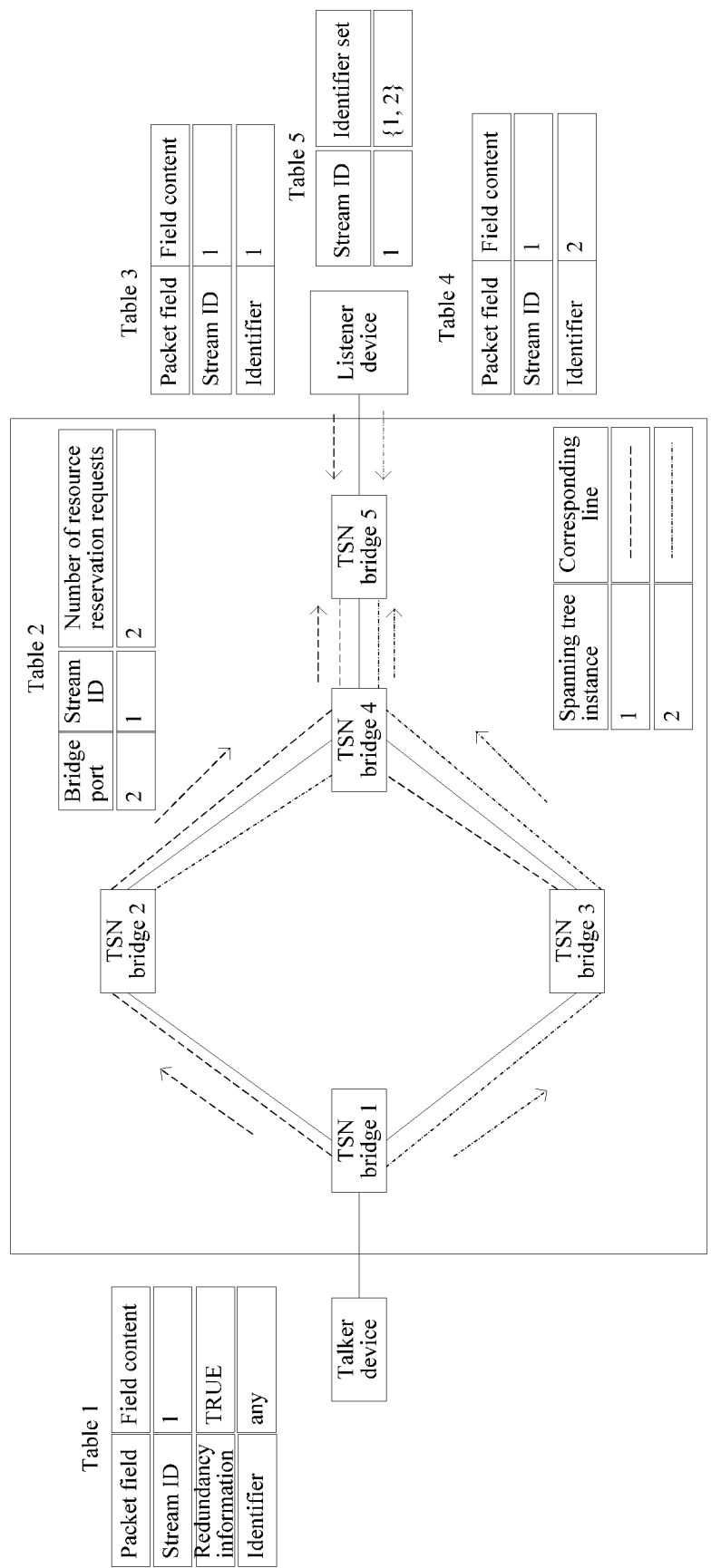
FIG. 13 is a schematic processing flow of SRP-based redundant path resource reservation according to the present application.
Figure 14:
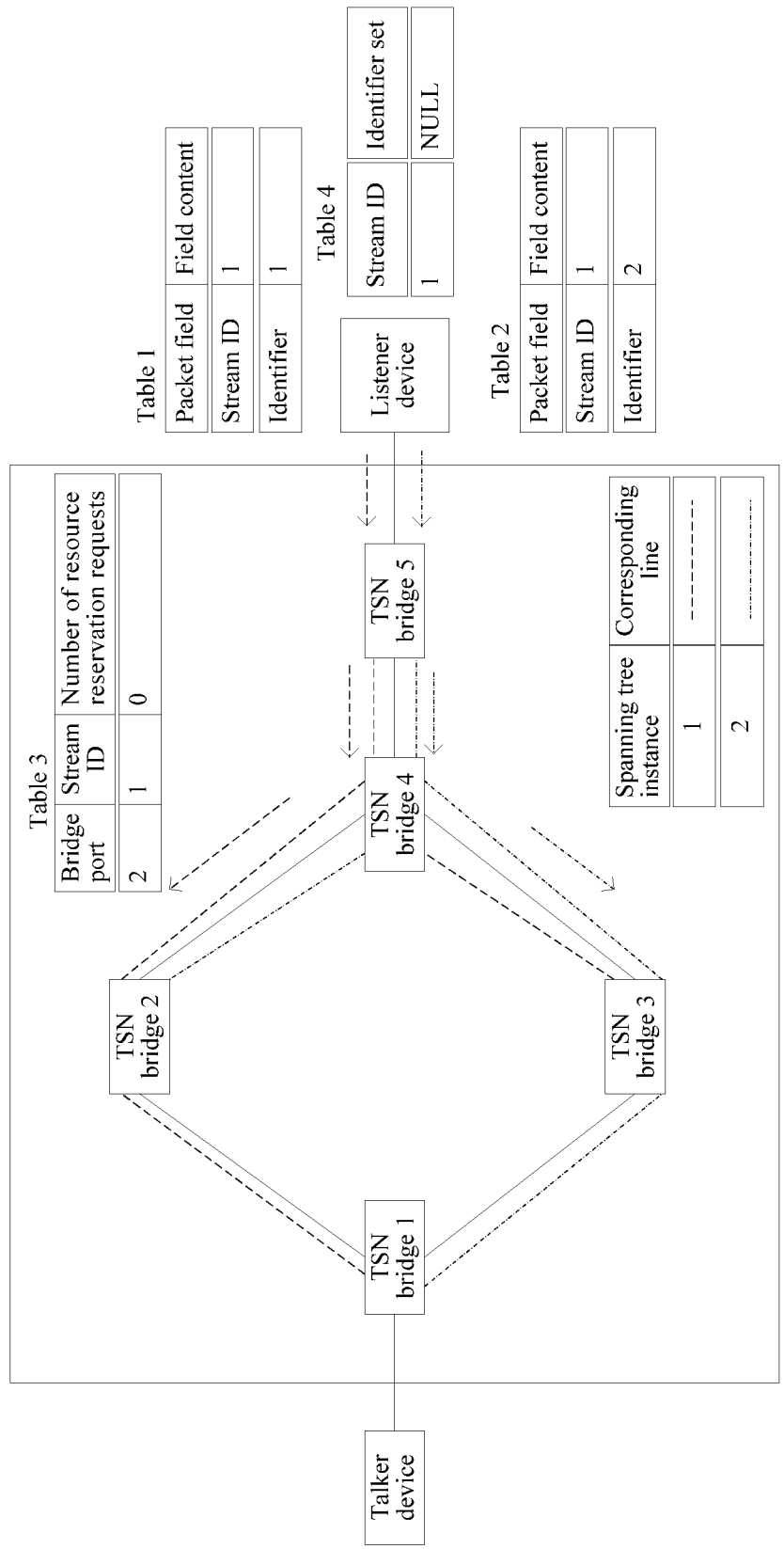
FIG. 14 is a schematic processing flow of SRP-based redundant path resource reservation cancellation according to the present application.

For better understanding of the present application, a detailed flowchart of a redundant path resource reservation method according to the present application is described below with reference to FIGS. 13 and 14. FIG. 13 is a schematic processing flow of SRP-based redundant path resource reservation according to the present application. FIG. 14 is a schematic processing flow of SRP-based redundant path resource reservation cancellation according to the present application.

In FIG. 13, an exemplary TSN network may include five bridge devices (hereinafter, simply referred to as bridges), for example, a TSN bridge 1, a TSN bridge 2, a TSN bridge 3, a TSN bridge 4, and a TSN bridge 5. It is assumed that a spanning tree corresponding to a primary spanning tree and a spanning tree corresponding to a standby spanning tree are established in the TSN network, which are respectively represented by a line 1 and a line 2, and have corresponding spanning tree identifiers 1 and 2.

In FIG. 13, the Table 1 above the talker device shows main fields of a talker attribute declaration packet, where a stream ID is 1, indicating reserve resources for a service stream with a stream ID 1. As an example, the TSN service stream ID is {01:00:5e:01:01:01,2}. A Redundancy field value is TRUE, indicating that the network is desired to provide redundant propagation for the TSN service, and an Identifier field takes a value of any.

The Talker sends a talker attribute declaration packet to the TSN bridge 1. After receiving the talker attribute declaration packet, the TSN bridge 1 extracts the Redundancy field TRUE in the packet, duplicate a copy of the packet, sets the Identifier field of the original packet to 1 and the Identifier field of the duplicated packet to 2, sets Redundancy fields of the two packets to FALSE, registers attribute information carried in the talker attribute packet at a port, and then propagates the original packet along the spanning tree represented by the line 1, and the duplicated packet along the spanning tree represented by the line 2.

When the TSN bridges 2, 3 4, and 5 receive the extended talker attribute declaration packet, field contents in the packet are parsed. If the Redundancy field value is FALSE, the Identifier field is further extracted, the spanning tree instance table shown in Table 2 is looked up according to the Identifier field, and then the packet is propagated in the corresponding spanning tree.

The listener device, interested in the service stream with the stream ID 1, receives two talker attribute declaration packets with the stream ID 1 successively, extracts the Identifier fields in the packets, and constructs and sends out corresponding listener resource reservation request packets respectively, which contain the contents shown in Tables 3 and 4.

In this example, the listener device is desired to save the received spanning tree identifier value corresponding to the stream ID in a table it maintains, as shown in Table 5 beside the listener device, to obtain a maintained spanning tree identifier set corresponding to the stream ID.

After a listener resource reservation request packet is received at each port of the bridge device, bandwidth reservation is performed along the line and a forwarding table is established. If two or more listener resource reservation request packets are received at a same port, repeated resource reservation or forwarding table establishment should be avoided.

For example, the TSN bridges 4 and 5 each receive two listener resource reservation request packets, which carry the spanning tree identifiers 1 and 2, respectively. Taking a port 2 of the TSN bridge 4 as an example, when a first listener packet is received, the stream ID in the packet is extracted and looked up in Table 2. If no table entry is hit, a forwarding table entry with key values {01:00:5e:01:01:01,2} is established and resources are reserved. Then, a table entry corresponding to the port 2 and the stream ID is established in Table 2, where the number of listener resource reservation requests is 1. When a second listener resource reservation request packet is received, the stream ID in the packet is extracted, and it is found that the registration number of a listener attribute corresponding to the port 2 and the stream ID is greater than 0, the resource reservation and establishment of the forwarding table entry are not repeated. Instead, the number of corresponding listener resource reservation requests are added by 1 to obtain the number of resource reservation requests 2.

In the present application, when the talker device performs resource reservation cancellation, a Redundancy field and an Identifier field are desired to be carried in an attribute cancellation packet. The processing flow of the Redundancy field and the Identifier field by the bridge when receiving a talker attribute cancellation packet is similar to that when receiving a talker attribute declaration packet, which is not repeated here.

In FIG. 14, in the listener device, for example, a value of the spanning tree identifier corresponding to the stream ID of 1 is maintained; and the number of resource reservation requests received at each bridge port corresponding to the stream ID is maintained in each bridge of the TSN.

When the listener device initiates resource reservation cancellation corresponding to the stream ID 1, the listener device looks up a mapping relationship table of stream IDs and spanning tree identifiers, to obtain a set of spanning tree identifier values including a spanning tree identifier 1 and a spanning tree identifier 2 (see FIG. 13). The listener device sequentially constructs listener resource reservation cancellation packets according to the spanning tree identifier 1 and the spanning tree identifier 2, and the contents of the two listener resource reservation cancellation packets are shown in Tables 1 and 2 in FIG. 14.

When the listener resource reservation cancellation packet is received at each bridge port, the bandwidth resource is released and the corresponding forwarding table entry is deleted. Specifically, when the number of listener terminal resource reservation requests at the port is greater than or equal to 2, the port releases the reserved resource only when receiving a last resource reservation cancellation packet.

For example, when the Identifier field in the listener resource reservation cancellation packet received at the port 2 of the TSN bridge 4 takes a value 1, merely Table 3 in the figure is updated, and the number of listener resource reservation requests corresponding to the stream ID is decreased by 1. When the Identifier field in the received listener packet takes a value 2, Table 3 in the figure is updated, and the number of listener resource reservation requests corresponding to the stream ID is decreased by 1. At this time, the number of listener resource reservation requests corresponding to the stream ID (S-ID) is 0, so the resource is released and the forwarding table entry is deleted.

After the reserved resource is successfully canceled, as shown in Table 4 beside the listener device in FIG. 14, the stream ID maintained in the listener device is 1 and a set stream of the spanning tree identifier values is NULL.

According to the redundant path resource reservation method of the present application, a talker attribute declaration packet is extended to carry a Redundancy field and an Identifier field, a bridge port connected to the talker is taken as an agent of the redundant path function, and parsing of the Redundancy field is increased, and when it is determined that a value of the Redundancy field indicates that the network is desired to establish a redundant path, the talker attribute declaration packet is duplicated and modified, and the packets are propagated in two different spanning tree instances according to the carried spanning tree identifiers, thereby establishing a redundant service protective path for the TSN service.

Figure 15:
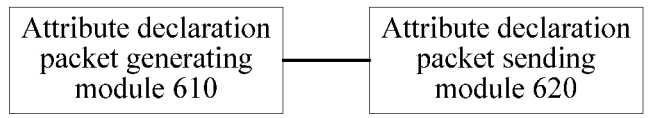
FIG. 15 is a schematic structural diagram of a redundant path resource reservation apparatus according to the present application.

The redundant path resource reservation apparatus according to the present application will be described in detail below with reference to FIG. 15. FIG. 15 is a schematic structural diagram of a redundant path resource reservation apparatus according to the present application.

As shown in FIG. 15, the redundant path resource reservation apparatus may be applied to a talker device, and may include an attribute declaration packet generating module 610 and an attribute declaration packet sending module 620.

The attribute declaration packet generating module 610 is configured to generate, in response to determining to provide redundant path resource reservation for a TSN service, a first attribute declaration packet for the TSN service. The first attribute declaration packet carries an indication of providing redundant propagation for the attribute declaration packet.

The attribute declaration packet sending module 620 is configured to send the first attribute declaration packet to a bridge device connected to the talker device. At least two spanning tree instances are maintained in the bridge device, and the at least two spanning tree instances are configured to establish a redundant path for the TSN service between the talker device and a designated listener device according to the indication of the first attribute declaration packet.

In an implementation, the attribute declaration packet generating module 610 is further configured to: generate a first attribute declaration packet for the TSN service. The first attribute declaration packet carries a stream ID for identifying the TSN service, redundancy information taking a first redundancy information value, and a spanning tree identifier taking a value of any. The first redundancy information value is configured to indicate providing redundant propagation for the first attribute declaration packet, and the value of any is configured to indicate a spanning tree instance on which propagation of the first attribute declaration packet is based.

In an implementation, in response to determining not to provide redundant path resource reservation for the TSN service, the attribute declaration packet generating module 610 is further configured to: generate a second attribute declaration packet for the TSN service. The second attribute declaration packet carries a stream ID for identifying the TSN service, redundancy information taking a second redundancy information value, and a spanning tree identifier taking a preset identifier value. The second redundancy information value is configured to indicate not providing redundant propagation for the second attribute declaration packet, and the preset identifier value is configured to indicate a spanning tree instance on which propagation of the second attribute declaration packet is based.

According to the redundant path resource reservation apparatus of the present application, the talker device may extend an SRP-based talker packet to carry a Redundancy field and an Identifier field, indicate, through the Redundancy field, whether to provide redundant propagation for the attribute declaration packet, and send, according to the spanning tree instance indicated by the spanning tree identifier, the attribute declaration packet for the TSN service to a bridge port directly connected to the talker device, to trigger the redundant path resource reservation for the TSN service identified by the stream ID.

Figure 16:
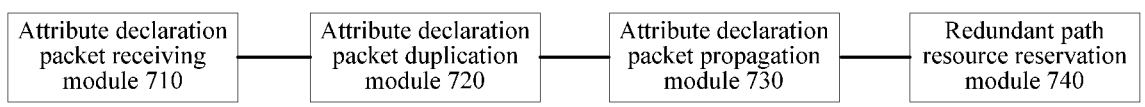
FIG. 16 is a schematic structural diagram of a redundant path resource reservation apparatus according to the present application.

FIG. 16 is a schematic structural diagram of a redundant path resource reservation apparatus according to the present application. As shown in FIG. 16, the redundant path resource reservation apparatus may be applied to a bridge device, and may include an attribute declaration packet receiving module 710, an attribute declaration packet duplication module 720, an attribute declaration packet propagation module 730, and a redundant path resource reservation module 740.

The attribute declaration packet receiving module 710 is configured to acquire, from a received attribute declaration packet of a talker device, a TSN service targeted by the attribute declaration packet and an indication of whether to provide redundant propagation for the attribute declaration packet.

The attribute declaration packet duplication module 720 is configured to duplicate the attribute declaration packet in response to the indication of providing the redundant propagation for the attribute declaration packet, and there are at least two spanning tree instances maintained in the bridge device.

The attribute declaration packet propagation module 730 is configured to propagate, on the basis of the at least two spanning tree instances, the received attribute declaration packet and the duplicated attribute declaration packet, to establish a redundant path for the TSN service between the talker device and a listener device.

The redundant path resource reservation module 740 is configured to perform, in response to receiving a resource reservation request packet for the TSN service from the listener device, redundant path resource reservation for the TSN service.

In an implementation, the received attribute declaration packet carries a stream ID and redundancy information, and the attribute declaration packet receiving module 710 may be configured to: take a TSN service indicated by the stream ID carried in the received attribute declaration packet as the TSN service targeted by the attribute declaration packet; determine, in response to the redundancy information taking a first redundancy information value, to provide redundant propagation for the attribute declaration packet; and determine, in response to the redundancy information taking a second redundancy information value, not to provide redundant propagation for the attribute declaration packet. The second redundancy information value is different from the first redundancy information value.

In an implementation, in response to determining to provide redundant propagation for the attribute declaration packet, the attribute declaration packet propagation module 730 may be configured to: modify, according to spanning tree identifiers of the acquired at least two spanning tree instances, a spanning tree identifier in the received attribute declaration packet and a spanning tree identifier in the duplicated attribute declaration packet into different spanning tree identifiers; modify each of the redundancy information in the received attribute declaration packet and the redundancy information in the duplicated attribute declaration packet into the second redundancy information value; and propagate the received attribute declaration packet and the duplicated attribute declaration packet in different spanning tree instances according to the modified different spanning tree identifiers, to establish the redundant path for the TSN service.

In an implementation, if it indicates providing redundant propagation for the attribute declaration packet, and less than two spanning tree instances are maintained in the bridge device, then the attribute declaration packet sending module 740 may be configured to: set an indication of not providing redundant propagation for the received attribute declaration packet, and propagate the received attribute declaration packet based on a preset spanning tree instance in the spanning tree instances maintained in the bridge device.

In an implementation, the attribute declaration packet sending module 740 may be further configured to: set a spanning tree identifier carried in the received attribute declaration packet as a preset identifier value that is configured to indicate the preset spanning tree instance; set redundancy information carried in the received attribute declaration packet as the second redundancy information value that is configured to indicate not providing redundant propagation for the attribute declaration packet; and propagate, based on the preset spanning tree instance, an attribute declaration packet carrying the second redundancy information value and the preset identifier value.

In an implementation, if the received attribute declaration packet indicates not providing redundant propagation for the attribute declaration packet, the attribute declaration packet sending module 740 may be configured to: forward the received attribute declaration packet based on the spanning tree instance indicated by the spanning tree identifier carried in the received attribute declaration packet.

In an implementation, the redundant path resource reservation apparatus may further include: an attribute registration module configured to register attribute information contained in the received attribute declaration packet at a port of the bridge device where the attribute declaration packet is received.

In an implementation, the redundant path resource reservation module 740 may be configured to: receive a resource reservation request packet from the listener device through a first port, where the resource reservation request packet carries a stream ID and a spanning tree identifier, and the first port is any one of a plurality of ports of the bridge device; reserve, in response to that a bandwidth of the first port meets a preset bandwidth requirement and the number of first resource reservation requests is zero, bandwidth resources for a TSN service indicated by the stream ID carried in the resource reservation request packet, and establish a forwarding table entry, where the number of first resource reservation requests is the number of resource reservation requests for the TSN service received at the first port, which is recorded in the bridge device in advance.

In an implementation, the redundant path resource reservation apparatus may further include: a resource reservation request number updating module configured to after reserving bandwidth resources for the TSN service indicated by the stream ID and establishing the forwarding table entry, or when the bandwidth of the first port meets the preset bandwidth requirement and the number of first resource reservation requests is greater than or equal to 1, add 1 to the recorded number of first resource reservation requests, to obtain an updated number of first resource reservation requests; and a resource reservation request packet forwarding module configured to forward the resource reservation request packet based on the spanning tree instance indicated by the spanning tree identifier carried in the resource reservation request packet.

In an implementation manner, if the bandwidth of the first port does not meet the preset bandwidth requirement, the resource reservation request packet forwarding module may be further configured to: forward the resource reservation request packet based on the spanning tree instance indicated by the spanning tree identifier carried in the resource reservation request packet.

In an implementation, the redundant path resource reservation apparatus may further include a resource reservation cancellation packet receiving module and a resource reservation cancellation packet forwarding module. The resource reservation cancellation packet receiving module is configured to receive a resource reservation cancellation packet from the listener device through the first port, where the resource reservation cancellation packet carries a stream ID of the TSN service and a spanning tree identifier. The resource reservation request number updating module may be further configured to subtract 1 from the recorded number of first resource reservation requests, to obtain an updated number of first resource reservation requests. The resource reservation cancellation packet forwarding module is configured to: delete, in response to that the updated number of first resource reservation requests is zero, the forwarding table entry of the TSN service and release the reserved bandwidth resources for the TSN service, and forward the resource reservation cancellation packet according to a spanning tree instance indicated by the spanning tree identifier carried in the resource reservation cancellation packet; and forward, in response to that the updated number of first resource reservation requests is greater than or equal to 1, the resource reservation cancellation packet according to the spanning tree instance indicated by the spanning tree identifier carried in the resource reservation cancellation packet.

According to the redundant path resource reservation apparatus of the present application, the bridge device may parse the redundancy information carried in the received SRP-based attribute declaration packet, if the redundancy information indicates providing redundant propagation for the attribute declaration packet and the number of corresponding spanning tree instances in the bridge device is greater than a preset value, the attribute declaration packet is duplicated and modified according to the corresponding spanning tree instances, so that the received attribute declaration packet and the duplicated attribute declaration packet can be propagated in spanning tree instances indicated by their respective spanning tree identifiers, thereby establishing a redundant service protective path for the TSN service.

Figure 17:
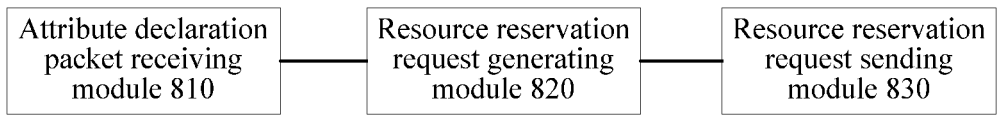
FIG. 17 is a schematic structural diagram of a redundant path resource reservation apparatus according to the present application.

FIG. 17 is a schematic structural diagram of a redundant path resource reservation apparatus according to the present application. As shown in FIG. 17, the redundant path resource reservation apparatus may be applied to a listener device, and may include an attribute declaration packet receiving module 810, a resource reservation request generating module 820, and a resource reservation request sending module 830.

The attribute declaration packet receiving module 810 is configured to receive, through a bridge device connected to the listener device, at least two attribute declaration packets for a same TSN service.

The resource reservation request generating module 820 is configured to generate, in response to that the TSN service is a TSN service of interest to the listener device and each received attribute declaration packet is a packet propagated based on a different spanning tree instance, a resource reservation request packet for the TSN service and corresponding to the different spanning tree instance for each received attribute declaration packet.

The different spanning tree instance is one of at least two spanning tree instances maintained in the bridge device connected to the listener device, and the at least two spanning tree instances are configured to establish a redundant path for the TSN service between a talker device and the listener device.

The resource reservation request sending module 830 is configured to send, based on the different spanning tree instance corresponding to each generated resource reservation request packet, each resource reservation request packet to the bridge device connected to the listener device.

In an implementation, the redundant path resource reservation apparatus may further include an identifier information acquiring module configured to acquire, after receiving the at least two attribute declaration packets for the same TSN service, a stream ID and a spanning tree identifier carried in each attribute declaration packet. The stream ID is configured to identify the TSN service, and the spanning tree identifier is configured to indicate a spanning tree instance on which propagation of the attribute declaration packet in the bridge device is based.

In an implementation, the redundant path resource reservation apparatus may further include: an identifier information adding module configured to carry, when generating the resource reservation request packet for the TSN service and corresponding to the different spanning tree instance, a stream ID for identifying the TSN service and a spanning tree identifier corresponding to the different spanning tree instance in the resource reservation request packet.

In an implementation, the redundant path resource reservation apparatus may further include an identifier information recording module configured to record a stream ID and a corresponding spanning tree identifier carried in each received attribute declaration packet. The spanning tree identifier is configured to indicate a spanning tree instance on which propagation of the attribute declaration packet in the bridge device is based.

In an implementation, the identifier information adding module may be further configured to acquire, in response to determining to provide resource cancellation for the TSN service, the stream ID of the TSN service and the corresponding spanning tree identifier from the pre-recorded stream IDs and corresponding spanning tree identifiers. The redundant path resource reservation apparatus may further include a resource reservation cancellation packet generating module, a resource reservation cancellation packet sending module, and an information record updating module. The resource reservation cancellation packet generating module is configured to generate a corresponding resource reservation cancellation packet for each identifier corresponding to the TSN service. The resource reservation cancellation packet carries a stream ID of the TSN service and one spanning tree identifier corresponding to the TSN service. The resource reservation cancellation packet sending module is configured to send each resource reservation cancellation packet based on a spanning tree instance indicated by the spanning tree identifier carried in each generated resource reservation cancellation packet. The information record updating module is configured to delete preset information from the pre-recorded stream IDs and corresponding spanning tree identifiers. The preset information is the stream ID and the corresponding spanning tree identifier carried in the sent resource reservation cancellation packet.

According to the redundant path resource reservation apparatus of the present application, when receiving an SRP-based attribute declaration packet for a TSN service, the listener device may extract a stream ID and a spanning tree identifier carried in the attribute declaration packet and generate a resource reservation request packet which carries the stream ID and the spanning tree identifier to make a resource reservation request, thereby establishing a redundant service protective path for the TSN service.

It should be noted that the present application is not limited to the specific configurations and processing described in the above embodiments and shown in the figures. For convenience and simplicity of description, detailed description of a known method is omitted here, and for the specific working processes of the system, the modules and the units described above, reference may be made to corresponding processes in the foregoing method embodiments, which are not repeated here.

Figure 18:
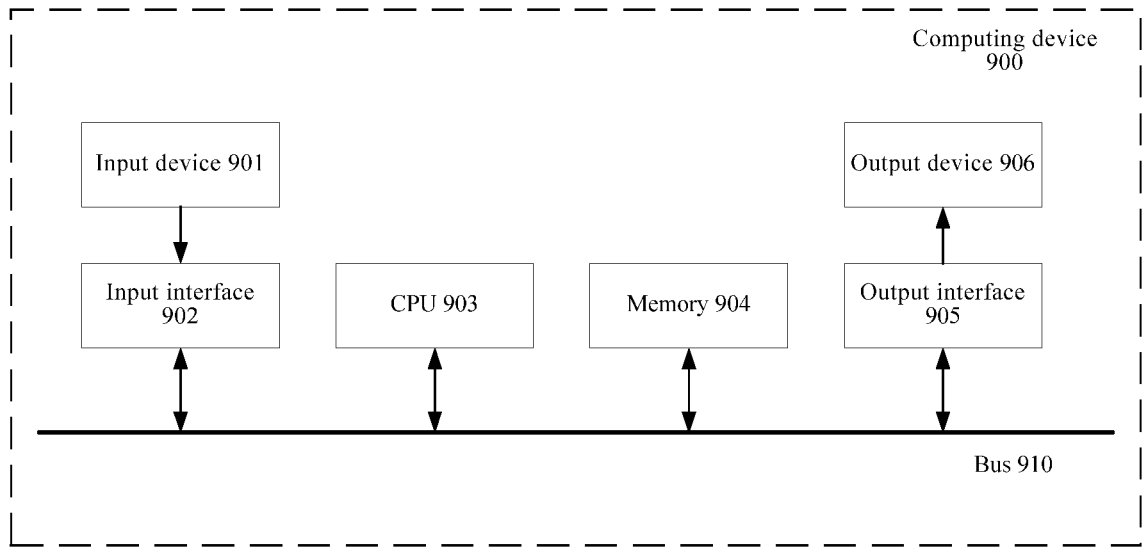
FIG. 18 is a block diagram of an exemplary hardware architecture of a computing device capable of implementing the redundant path resource reservation method according to the present application.

FIG. 18 is a block diagram of an exemplary hardware architecture of a computing device capable of implementing the redundant path resource reservation method according to the present application.

As shown in FIG. 18, the computing device 900 includes an input device 901, an input interface 902, a central processing unit 903, a memory 904, an output interface 905, and an output device 906. The input interface 902, the central processing unit 903, the memory 904, and the output interface 905 are connected to each other via a bus 910, and the input device 901 and the output device 906 are connected to the bus 910 via the input interface 902 and the output interface 905, respectively, and further connected to other components of the computing device 900.

The input device 901 may receive input information from the outside and transmit the input information to the central processing unit 903 through the input interface 902. The central processing unit 903 processes the input information based on computer-executable instructions stored in the memory 904 to generate output information, stores the output information temporarily or permanently in the memory 904, and then transmits the output information to the output device 906 through the output interface 905. The output device 906 outputs output information outside of the computing device 900 for use by a user.

The computing device shown in FIG. 18 may be implemented as a talker device, which may include: a memory configured to store a program; and a processor configured to execute the program stored on the memory to implement the redundant path resource reservation method applicable to the talker device according to the present application.

The computing device shown in FIG. 18 may be implemented as a bridge device, which may include: a memory configured to store a program; and a processor configured to execute the program stored in the memory to implement the redundant path resource reservation method applicable to the bridge device according to the present application.

The computing device shown in FIG. 18 may be implemented as a listener device, which may include: a memory configured to store a program; and a processor configured to execute the program stored in the memory to implement the redundant path resource reservation method applicable to the listener device according to the present application.

According to the redundant path resource reservation method of the present application, the bridge device may provide, according to at least two spanning tree instances maintained by the bridge device, redundant propagation for the attribute declaration packet of the talker device between the talker device and the listener device, so as to establish a redundant service path for the TSN service, and perform redundant path resource reservation for the TSN service according to a resource reservation request packet from the listener device.

According to the redundant path resource reservation method of the present application, the talker device may indicate, through an attribute declaration packet, that redundant propagation is desired to be provided for the attribute declaration packet, and send the attribute declaration packet to a bridge device connected thereto, so that the bridge device provides redundant propagation for the attribute declaration packet according to at least two spanning tree instances maintained, thereby establishing a redundant path for a TSN service between the talker device and a designated listener device.

According to the redundant path resource reservation method of the present application, when the listener device receives at least two attribute declaration packets for the TSN service and propagated based on different spanning tree instances, if the listener device is interested in the TSN service, a resource reservation request packet may be constructed for each received attribute declaration packet to initiate a resource reservation request for the redundant path of the TSN service. The different spanning tree instances are spanning tree instances of at least two spanning tree instances maintained in the bridge device connected to the listener device, and the at least two spanning tree instances are configured to establish a redundant path for the TSN service between a talker device and the listener device.

The above are only exemplary embodiments of the present application and not intended to limit the scope of the present application. In general, the various embodiments of the present application may be implemented in hardware or special purpose circuits, software, logic or any combination thereof. For example, some aspects may be implemented in hardware, while other aspects may be implemented in firmware or software which may be executed by a controller, a microprocessor or any other computing device, although the present application is not limited thereto.

Embodiments of the present application may be implemented by a data processor of a mobile device executing computer program instructions, for example, in a processor entity, or by hardware, or by a combination of software and hardware. The computer program instructions may be assembler instructions, instruction set architecture (ISA) instructions, machine instructions, machine-related instructions, microcodes, firmware instructions, state setting data, or source or object codes written in any combination of one or more programming languages.

The block diagrams of any logic flow in the figures of the present application may represent program operations, or may represent interconnected logic circuits, modules, and functions, or may represent a combination of program operations and logic circuits, modules, and functions. The computer program may be stored on a memory. The memory may be of any type suitable to the local technical environment and may be implemented in any suitable data storage technology, such as but not limited to, read only memories (ROMs), random access memories (RAMs), optical storage devices or systems (digital versatile discs (DVDs), compact discs (CDs)), etc. The computer-readable medium may include a non-transitory storage medium. The data processor may be of any type suitable to the local technical environment, such as but not limited to, general purpose computers, dedicated computers, microprocessors, digital signal processors (DSPs), application specific integrated circuits (ASICs), field programmable gate arrays (FGPAs), and processors based on multi-core processor architecture.

The foregoing has provided by way of exemplary and non-limiting examples a detailed description of exemplary embodiments of the present application. Various modifications and adaptations to the foregoing embodiments may become apparent to those skilled in the art in view of the accompanying drawings and the appended claims, without departing from the scope of the present application. Accordingly, the proper scope of the present application is to be determined according to the claims.

What is claimed is:

1. A redundant path resource reservation method applicable to a bridge device, comprising:
acquiring, from a received attribute declaration packet of a talker device, a time sensitive networking (TSN) service targeted by the attribute declaration packet and an indication of whether to provide redundant propagation for the attribute declaration packet;

duplicating the attribute declaration packet in response to the indication of providing the redundant propagation for the attribute declaration packet, and there are at least two spanning tree instances maintained in the bridge device;

propagating, on the basis of the at least two spanning tree instances, the received attribute declaration packet and the duplicated attribute declaration packet, to establish a redundant path for the TSN service between the talker device and a listener device; and performing, in response to receiving a resource reservation request packet for the TSN service from the listener device, redundant path resource reservation for the TSN service.

2. The method according to claim 1, wherein the received attribute declaration packet carries a stream ID and redundancy information, and the operation of acquiring, from the received attribute declaration packet of the talker device, the TSN service targeted by the attribute declaration packet and the indication of whether to provide redundant propagation for the attribute declaration packet comprises:

taking a TSN service indicated by the stream ID carried in the received attribute declaration packet as the TSN service targeted by the attribute declaration packet;

determining, in response to the redundancy information taking a first redundancy information value, to provide redundant propagation for the attribute declaration packet; and determining, in response to the redundancy information taking a second redundancy information value, not to provide redundant propagation for the attribute declaration packet;

wherein the second redundancy information value is different from the first redundancy information value.

3. The method according to claim 2, wherein in response to determining to provide redundant propagation for the attribute declaration packet, the operation of propagating, on the basis of the at least two spanning tree instances, the received attribute declaration packet and the duplicated attribute declaration packet, to establish the redundant path for the TSN service between the talker device and the listener device comprises:

modifying, according to spanning tree identifiers of the acquired at least two spanning tree instances, a spanning tree identifier in the received attribute declaration packet and a spanning tree identifier in the duplicated attribute declaration packet into different spanning tree identifiers;

modifying each of the redundancy information in the received attribute declaration packet and the redundancy information in the duplicated attribute declaration packet into the second redundancy information value; and propagating the received attribute declaration packet and the duplicated attribute declaration packet in different spanning tree instances according to the modified different spanning tree identifiers, to establish the redundant path for the TSN service.

4. The method according to claim 1, wherein the indication indicates providing redundant propagation for the attribute declaration packet, and less than two spanning tree instances are maintained in the bridge device, and the method further comprises:

setting an indication of not providing redundant propagation for the received attribute declaration packet, and propagating the received attribute declaration packet based on a preset spanning tree instance in the spanning tree instances maintained in the bridge device.

5. The method according to claim 4, wherein the operation of setting the indication of not providing redundant propagation for the received attribute declaration packet, and propagating the received attribute declaration packet based on the preset spanning tree instance in the spanning tree instances maintained in the bridge device comprises:

setting a spanning tree identifier carried in the received attribute declaration packet as a preset identifier value that is configured to indicate the preset spanning tree instance;

setting redundancy information carried in the received attribute declaration packet as a second redundancy information value that is configured to indicate not providing redundant propagation for the attribute declaration packet; and propagating, based on the preset spanning tree instance, an attribute declaration packet carrying the second redundancy information value and the preset identifier value.

6. The method according to claim 1, wherein the operation of performing, in response to receiving the resource reservation request packet for the TSN service from the listener device, redundant path resource reservation for the TSN service comprises:

receiving a resource reservation request packet from the listener device through a first port, wherein the resource reservation request packet carries a stream ID and a spanning tree identifier, and the first port is any one of a plurality of ports of the bridge device; and reserving, in response to that a bandwidth of the first port meets a preset bandwidth requirement and the number of first resource reservation requests is zero, bandwidth resources for a TSN service indicated by the stream ID carried in the resource reservation request packet, and establishing a forwarding table entry, wherein the number of first resource reservation requests is the number of resource reservation requests for the TSN service received at the first port, which is recorded in the bridge device in advance.

7. The method according to claim 6, wherein after the operation of reserving bandwidth resources for the TSN service indicated by the stream ID carried in the resource reservation request packet, and establishing the forwarding table entry, or when the bandwidth of the first port meets the preset bandwidth requirement and the number of first resource reservation requests is greater than or equal to 1, the method further comprises:

adding 1 to the recorded number of first resource reservation requests, to obtain an updated number of first resource reservation requests; and forwarding the resource reservation request packet based on the spanning tree instance indicated by the spanning tree identifier carried in the resource reservation request packet.

8. The method according to claim 6, further comprising:

receiving a resource reservation cancellation packet from the listener device through the first port, wherein the resource reservation cancellation packet carries a stream ID of the TSN service and a spanning tree identifier;

subtracting 1 from the recorded number of first resource reservation requests, to obtain an updated number of first resource reservation requests;

deleting, in response to that the updated number of first resource reservation requests is zero, the forwarding table entry of the TSN service and releasing the reserved bandwidth resources for the TSN service, and forwarding the resource reservation cancellation packet according to a spanning tree instance indicated by the spanning tree identifier carried in the resource reservation cancellation packet; and forwarding, in response to that the updated number of first resource reservation requests is greater than or equal to 1, the resource reservation cancellation packet according to the spanning tree instance indicated by the spanning tree identifier carried in the resource reservation cancellation packet.

9. A network device, comprising:
one or more processors; and
a memory having one or more programs stored thereon which,
when executed by the one or more processors, cause the one or more processors to implement the method according to claim 1.

10. A non-transitory storage medium having a computer program stored thereon which, when executed by a processor, causes the processor to implement the method according to claim 1.

11. A redundant path resource reservation method applicable to a talker device, comprising:
generating, in response to determining to provide redundant path resource reservation for a time sensitive networking (TSN) service, a first attribute declaration packet for the TSN service, wherein the first attribute declaration packet carries an indication of providing redundant propagation for the attribute declaration packet; and sending the first attribute declaration packet to a bridge device connected to the talker device, wherein at least two spanning tree instances are maintained in the bridge device, and the at least two spanning tree instances are configured to establish a redundant path for the TSN service between the talker device and a designated listener device according to the indication of the first attribute declaration packet.

12. The method according to claim 11, wherein the operation of generating the first attribute declaration packet for the TSN service, the first attribute declaration packet carries the indication of providing redundant propagation for the attribute declaration packet comprises:
generating the first attribute declaration packet for the TSN service, wherein the first attribute declaration packet carries a stream ID for identifying the TSN service, redundancy information taking a first redundancy information value, and a spanning tree identifier taking a value of any,
wherein the first redundancy information value is configured to indicate providing redundant propagation for the first attribute declaration packet, and the value of any is configured to indicate a spanning tree instance on which propagation of the first attribute declaration packet is based.

13. The method according to claim 11, wherein in response to determining not to provide redundant path resource reservation for the TSN service, the method further comprises:
generating a second attribute declaration packet for the TSN service, wherein the second attribute declaration packet carries a stream ID for identifying the TSN service, redundancy information taking a second redundancy information value, and a spanning tree identifier taking a preset identifier value, wherein the second redundancy information value is configured to indicate not providing redundant propagation for the second attribute declaration packet, and the preset identifier value is configured to indicate a spanning tree instance on which propagation of the second attribute declaration packet is based.

14. A network device, comprising:
one or more processors; and
a memory having one or more programs stored thereon which,
when executed by the one or more processors, cause the one or more processors to implement the method according to claim 11.

15. A non-transitory storage medium having a computer program stored thereon which, when executed by a processor, causes the processor to implement the method according to claim 11.

16. A redundant path resource reservation method applicable to a listener device, comprising:
receiving, through a bridge device connected to the listener device, at least two attribute declaration packets for a same time sensitive networking (TSN) service;
generating, in response to that the TSN service is a TSN service of interest to the listener device and each received attribute declaration packet is a packet propagated based on a different spanning tree instance, a resource reservation request packet for the TSN service and corresponding to the different spanning tree instance for each received attribute declaration packet, wherein the different spanning tree instance is one of at least two spanning tree instances maintained in the bridge device connected to the listener device, and the at least two spanning tree instances are configured to establish a redundant path for the TSN service between a talker device and the listener device; and
sending, based on the different spanning tree instance corresponding to each generated resource reservation request packet, each resource reservation request packet to the bridge device connected to the listener device.

17. The method according to claim 16, wherein after the operation of receiving the at least two attribute declaration packets for the same TSN service, the method further comprises:
acquiring a stream ID and a spanning tree identifier carried in each attribute declaration packet, wherein the stream ID is used for identifying the TSN service, and the spanning tree identifier is configured to indicate a spanning tree instance on which propagation of the attribute declaration packet in the bridge device is based;
and wherein the operation of generating the resource reservation request packet for the TSN service and corresponding to the different spanning tree instance comprises:
carrying a stream ID for identifying the TSN service and a spanning tree identifier corresponding to the different spanning tree instance in the resource reservation request packet.

18. The method according to claim 16, further comprising:
acquiring, in response to determining to provide resource cancellation for the TSN service, the stream ID of the TSN service and the corresponding spanning tree identifier from the pre-recorded stream IDs and corresponding spanning tree identifiers;

generating a corresponding resource reservation cancellation packet for each spanning tree identifier corresponding to the TSN service, wherein the resource reservation cancellation packet carries a stream ID of the TSN service and one spanning tree identifier corresponding to the TSN service;

sending each resource reservation cancellation packet based on a spanning tree instance indicated by the spanning tree identifier carried in each generated resource reservation cancellation packet; and deleting preset information from the pre-recorded stream IDs and corresponding spanning tree identifiers, wherein the preset information is the stream ID and the corresponding spanning tree identifier carried in the sent resource reservation cancellation packet.

19. A network device, comprising:

one or more processors; and a memory having one or more programs stored thereon which, when executed by the one or more processors, cause the one or more processors to implement the method according to claim 16.

20. A non-transitory storage medium having a computer program stored thereon which, when executed by a processor, causes the processor to implement the method according to claim 16.

* * * * *